United States Patent
Royak et al.

(10) Patent No.: US 10,020,766 B2
(45) Date of Patent: Jul. 10, 2018

(54) CURRENT CONTROL OF MOTOR DRIVES WITH OUTPUT SINEWAVE FILTER

(71) Applicant: Rockwell Automation Technologies, Inc., Mayfield Heights, OH (US)

(72) Inventors: Semyon Royak, Orange Village, OH (US); Robert J. Breitzmann, South Russell, OH (US); Jingbo Liu, Grafton, WI (US); Thomas A. Nondahl, Greenfield, WI (US); Jingya Dai, British Columbia (CA); Peter B. Schmidt, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/351,989

(22) Filed: Nov. 15, 2016

(65) Prior Publication Data
US 2018/0138849 A1    May 17, 2018

(51) Int. Cl.
| | |
|---|---|
| G05F 1/70 | (2006.01) |
| G05B 13/02 | (2006.01) |
| H02P 23/26 | (2016.01) |
| H02P 23/14 | (2006.01) |
| H02M 1/42 | (2007.01) |

(52) U.S. Cl.
CPC ............. *H02P 23/26* (2016.02); *H02P 23/14* (2013.01); *H02M 1/4216* (2013.01)

(58) Field of Classification Search
None
See application file for complete search history.

(56) References Cited

U.S. PATENT DOCUMENTS

| | | |
|---|---|---|
| 3,723,840 A | 3/1973 | Opal et al. |
| 4,823,251 A | 4/1989 | Kawabata et al. |
| 5,032,771 A | 7/1991 | Kerkman |
| 5,526,252 A | 6/1996 | Erdman |
| 5,703,449 A | 12/1997 | Nagate |
| 5,717,305 A | 2/1998 | Seibel |

(Continued)

FOREIGN PATENT DOCUMENTS

| | | |
|---|---|---|
| CN | 2513286 Y | 9/2002 |
| CN | 101385385 A | 3/2009 |

(Continued)

OTHER PUBLICATIONS

"Guidelines for the Use of 400-600 Volt AC Drives in Medium Voltage Applications," Yaskawa Application Note, Jun. 7, 2005.

(Continued)

*Primary Examiner* — Bentsu Ro
*Assistant Examiner* — Zemenay Truneh
(74) *Attorney, Agent, or Firm* — Fay Sharpe LLP

(57) ABSTRACT

Disclosed examples include power conversion systems, methods and computer readable mediums to operate an inverter to drive a motor load through an output filter, in which a control output value is computed according to a current reference value and a current feedback value using a proportional-integral (PI) current regulator, the control output value is filtered using a lag compensator filter to compute an inverter output command value, and the inverter is controlled according to the inverter output command value.

15 Claims, 11 Drawing Sheets

(56) References Cited

U.S. PATENT DOCUMENTS

| | | | |
|---|---|---|---|
| 5,744,921 | A | 4/1998 | Makaran |
| 5,909,098 | A | 6/1999 | Konecny et al. |
| 5,959,431 | A | 9/1999 | Xiang |
| 5,990,654 | A | 11/1999 | Skibinski et al. |
| 5,994,869 | A | 11/1999 | Becerra |
| 6,121,736 | A | 9/2000 | Narazaki et al. |
| 6,124,697 | A | 9/2000 | Wilkerson |
| 6,208,537 | B1 | 3/2001 | Skibinski et al. |
| 6,222,335 | B1 | 4/2001 | Hiti et al. |
| 6,329,781 | B1 | 12/2001 | Matsui et al. |
| 6,600,980 | B1 | 7/2003 | Kraska et al. |
| 6,940,249 | B2 | 9/2005 | Toyoda |
| 6,965,212 | B1 | 11/2005 | Wang et al. |
| 7,045,988 | B2 | 5/2006 | Ha et al. |
| 7,049,778 | B2 | 5/2006 | Katanaya |
| 7,084,604 | B2 | 8/2006 | Salomaki |
| 7,102,323 | B2 | 9/2006 | Zhou et al. |
| 7,468,595 | B2 | 12/2008 | Lee |
| 7,679,308 | B2 | 3/2010 | Tomigashi |
| 7,683,568 | B2 * | 3/2010 | Pande ............... H02M 1/4216 318/438 |
| 7,724,549 | B2 | 5/2010 | Skibinski et al. |
| 7,729,146 | B2 | 6/2010 | Hayami et al. |
| 7,920,393 | B2 | 4/2011 | Bendre et al. |
| 7,932,693 | B2 | 4/2011 | Lee |
| 7,979,223 | B2 | 7/2011 | Monti et al. |
| 7,990,097 | B2 | 8/2011 | Cheng et al. |
| 8,009,450 | B2 | 8/2011 | Royak et al. |
| 8,143,838 | B2 | 3/2012 | Akiyama |
| 8,217,602 | B2 | 7/2012 | Ikei |
| 8,232,760 | B2 | 7/2012 | Lu et al. |
| 8,288,886 | B2 | 10/2012 | Anwar et al. |
| 8,299,646 | B2 | 10/2012 | Rockenfeller et al. |
| 8,350,507 | B2 | 1/2013 | Ito |
| 8,541,971 | B2 | 9/2013 | Sakai |
| 8,736,220 | B2 | 5/2014 | Ogawa et al. |
| 8,890,450 | B2 | 11/2014 | Maekawa |
| 8,970,154 | B2 | 3/2015 | Ishikawa et al. |
| 8,981,702 | B2 | 3/2015 | Katariya et al. |
| 9,240,733 | B2 | 1/2016 | Royak et al. |
| 2004/0052097 | A1 | 3/2004 | Morimoto |
| 2005/0012339 | A1 | 1/2005 | Mikhail et al. |
| 2006/0113952 | A1 | 6/2006 | Zhou et al. |
| 2007/0001635 | A1 | 1/2007 | Ho |
| 2007/0007929 | A1 | 1/2007 | Lee et al. |
| 2008/0001571 | A1 | 1/2008 | Tomigashi |
| 2008/0074074 | A1 | 3/2008 | Skibinski et al. |
| 2008/0300820 | A1 | 12/2008 | Hu |
| 2008/0312855 | A1 | 12/2008 | Monti et al. |
| 2009/0146592 | A1 | 6/2009 | Tobari et al. |
| 2009/0153083 | A1 | 6/2009 | Rozman |
| 2009/0200980 | A1 | 8/2009 | Ramu et al. |
| 2011/0062908 | A1 | 3/2011 | Kitanaka |
| 2011/0084638 | A1 | 4/2011 | Patel et al. |
| 2011/0109155 | A1 | 5/2011 | Anwar et al. |
| 2011/0181232 | A1 | 7/2011 | Krishnamoorthy et al. |
| 2012/0038300 | A1 | 2/2012 | Kato et al. |
| 2012/0081061 | A1 | 4/2012 | Zargari et al. |
| 2012/0268056 | A1 | 10/2012 | Liu |
| 2013/0063059 | A1 | 3/2013 | Chie et al. |
| 2013/0153180 | A1 | 6/2013 | Montocchio et al. |
| 2013/0187579 | A1 | 7/2013 | Rozman et al. |
| 2014/0197774 | A1 | 7/2014 | Liu et al. |
| 2014/0228980 | A1 * | 8/2014 | Ohta ............... G05B 13/021 700/29 |
| 2014/0265952 | A1 | 9/2014 | Katariya et al. |
| 2014/0312811 | A1 | 10/2014 | Liu et al. |
| 2015/0002059 | A1 | 1/2015 | Liu et al. |
| 2015/0002067 | A1 | 1/2015 | Rowan et al. |
| 2015/0123579 | A1 | 5/2015 | Liu et al. |

FOREIGN PATENT DOCUMENTS

| | | |
|---|---|---|
| CN | 201504207 U | 6/2010 |
| CN | 101950983 A | 1/2011 |
| CN | 102045021 A1 | 5/2011 |
| CN | 102349230 A | 2/2012 |
| CN | 202872721 U | 4/2013 |
| CN | 103190068 A | 7/2013 |
| EP | 1635448 A1 | 3/2006 |
| EP | 1868288 A1 | 12/2007 |
| GB | 2390766 A | 1/2004 |
| JP | 2001-025282 | 1/2001 |
| JP | 2002034289 A | 1/2002 |
| WO | WO2009093214 A2 | 7/2009 |

OTHER PUBLICATIONS

Agarlita, Sorin-Cristian et al., "I-f Starting and Active Flux Based Sensorless Vector Control of Reluctance Synchronous Motors, with Experiments", 12$^{th}$ Int'l Conf. on Optimization of Electrical and Electronic Equipment, OPTIM 2010, pp. 337-342.

Andreescu, G., et al. "Stable V/f Control System with Unity Power Factor for PMSM Drives", IEEE 13$^{th}$ Int'l Conf. on Optimization of Electrical and Electronic Equipment (OPTIM), May, 2012, pp. 432-438.

Batzel, Todd D. et al., "Electric Propulsion With Sensorless Permanent Magnet Synchronous Motor: Implementation and Performance", IEEE Transactions on Energy Conversion, vol. 20, No. 3, pp. 575-583, Sep. 2005.

Carpaneto, et al., "A New Sensorless Permanent Magnet Synchronous Motor Algorithm Based on Algebraic Method"; 13$^{th}$ European Conf. on Power Electronics and Applications, 2009; EPE 2009; Sep. 8-10, 2009, Barcelona, Spain; IEEE, Piscataway, NJ, Sep. 8, 2009, pp. 1-10.

Colby, Roy S., "An Efficiency-Optimizing Permanent-Magnet Synchronous Motor Drive", IEEE Transactions on Industry Applications, vol. 24, No. 3, May/Jun. 1998, pp. 462-469.

Fatu et al., I-F Starting Method With Smooth Transition to EMF Based Motion-Sensorless Vector Control of PM Synchronous Motor/Generator, 2008, IEEE, pp. 1481-1487.

Halkassari, Optimal U/F-Control of High Speed Permanent Magnet Motors, 2006, IEEE, pp. 2302-2308.

Iepure, Liviu Ioan et al., "Hybrid I-f Starting and Observer-Based Sensorless Control of Single-Phase BLDC-PM Motor Drives", IEEE Transactions on Industrial Electronics, vol. 59, No. 9, Sep. 2012, pp. 3436-3444.

J. Liu et al., "Rotor Position Estimation for Synchronous Machines Based on Equivalent EMF", IEEE Transactions on Industry Applications, vol. 47, pp. 1310-1318, May-Jun. 2011.

Jaitrong et al., "A Modify Technique to Actively Damp Oscillation in the Input LC Filter of Three-Phase PWM Rectifier", Electrical Engineering/Electronics, Computer, Telecommunications and Information Technology, 2008; Proceedings of ECTI-CON 2008; pp. 1017-1020.

Kim et al., "PWM Switching Frequency Signal Injection Sensorless Methods in IPMSM", IEEE, 2011, pp. 3021-3028.

Kiuchi, M., et al., "V/f Control of Permanent Magnet Synchronous Motors Suitable for Home Appliances by DC-link Peak Current Control Method", The Jun. 2010 Int'l Power Electronics Conference, IEEE 2010, pp. 567-573.

Kobayashi et al., "Investigation of IPMSM's Position Estimation in Low Speed Region with DC Link Current Detection", IEEE Jan. 2007, pp. 1411-1416.

Kojima, Mari et al., "Novel Vector Control System Using Deadbeat-Controlled PWM Inverter With Output LC Filter", IEEE Transactions on Industry Applications, vol. 40, No. 1, pp. 162-169, Jan./Feb. 2004.

Kubota et al., "Sensorless Vector Control of Closed-Slot Induction Machines at Low Frequency", IEEJ Journal of Industry Applications, vol. 2, No. 1, The Institute of Electrical Engineers of Japan, 2013, pp. 74-78.

(56) References Cited

OTHER PUBLICATIONS

Kukrer, "Deadbeat Control of a Three-Phase Inverter with an Output LC Filter", IEEE Transactions on Power Electronics, vol. 11, No. 1, Jan. 1996, 8 pgs.

Laczynski et al., "Active Damping of LC-Filters for High Power Drives Using Synchronous Optimal Pulsewidth Modulation", Power Electronics Specialists Conf., IEEE, Jun. 15, 2008, pp. 1033-1040.

Loh, Poh Chiang et al., "Analysis of Multiloop Control Strategies for LC/CL/LCL-Filtered Voltage-Source and Current-Source Inverters", IEEE Transactions on Industry Applications, vol. 41, No. 2, pp. 644-654, Mar./Apr. 2005.

Makridenko, L.A. et al., "Sensorless Drive With Synchronous Machine and Submersible Inverter for Oil-Drowned Pump", IEEE European Conf. on Power Electronics and Applications (EPE), pp. 1-10, Sep. 2009.

Matsushita, M., et al., "Stabilization Control of Sensorless Sinusoidal Wave Drive for Control of Power Factor of PM Motor", IEEE Int'l Conf. Electrical Machines and Systems (ICEMS), 2009, 5 pgs.

Miranda et al., "Parameter and Speed Estimation for Implementing Low Speed Sensorless PMSM Drive System Based on an Algebraic Method"; Applied Power Electronics Conf.; APEC 2007, $22^{nd}$ Annual IEEE; Feb. 1, 2007,;pp. 1406-1410.

Miranda et al., "Sensorless Control of a PMSM Synchronous Motor at Low Speed"; IEEE Industrial Electronics; IECON 2006; $32^{nd}$ Annual Conf., IEEE; Piscataway, NJ; Nov. 1, 2006; pp. 5069-5074.

Moldovan et al., "Active-Flux Based, V/f-With-Stabilizing-Loops Versus Sensorless Vector Control of IPMSM Drives"; Industrial Electronics (ISIE); 2011 IEEE Int'l Symposium; Jun. 27, 2011; pp. 514-519.

Mukherjee et al., "Fast Control of Filter for Sensorless Vector Control SQIM Drive With Sinusoidal Motor Voltage", IEEE Transactions on Industrial Electronics, vol. 54, No. 5, Oct. 2007, pp. 2435-2442.

Nakamura, Yoshinobu et al., "High-Efficiency Drive Due to Power Factor Control of a Permanent Magnet Synchronous Motor", IEEE Transactions on Power Electronics, vol. 10, No. 2, Mar. 1995, Manuscript rec'd Aug. 22, 1992, revised Sep. 13, 1994, pp. 247-253.

Park et al., "Analysis and Reduction of Time Harmonic Rotor Loss in Solid-Rotor Synchronous Reluctance Drive", IEEE Transactions on Power Electronics, vol. 23, No. 2, Mar. 1, 2008, pp. 985-992.

Park et al., "Design and Control of High-Speed Solid-Rotor Synchronous Reluctance Drive With Three-Phase LC Filter", Conference Record of the 2005 IEEE Industry Applications Conf. $40^{th}$ IAS Annual Meeting, vol. 1, Oct. 2, 2005, pp. 715-722.

Perera, P.D. Chandana, "A Sensorless, Stable V/f Control Method for Permanent-Magnet Synchronous Motor Drives", IEEE Transactions on Industry Applications, vol. 39, No. 3, May/Jun. 2003, IEEE 2003, pp. 783-791.

Ryvkin, S. et al., "Sensorless Oil Drowned Pump Drive", IEEE ISIE 2005, Jun. 20-23, 2005, Dubrovnik, Croatia, pp. 963-968.

Salomäki, J. et al., "Sensorless Control of Induction Motor Drives Equipped With Inverter Output Filter", IEEE Transactions on Industrial Electronics, vol. 53, No. 4, pp. 1188-1197, Aug. 2006.

Salomäki, J. et al., "Sensorless Vector Control of PMSM Drives Equipped With Inverter Output Filter", in Proceedings of the $32^{nd}$ Annual Conference of the IEEE Industrial Electronics Society (IECON 2006), Paris, France, pp. 1059-1064.

Steinke et al., "Use of a LC Filter to Achieve a Motorfriendly Performance of the PWM Voltage Source Inverter", Electric Machines and Drives Conference Record, 1997; IEEE, Milwaukee, WI, May 18, 1997, 3 pgs.

Stirban et al., "Motion-Sensorless Control of BLDC-PM Motor With Offline FEM-Information-Assisted Position and Speed Observer"; IEEE Transactions on Industry Applications; IEEE Service Center, Piscataway, NJ; vol. 48, No. 6; Nov. 1, 2012; pp. 1950-1958.

Stirban et al., "Motion-Sensorless Control of BLDC-PM Motor With Offline FEM Information Assisted State Observer"; Optimization of Electrical and Electronic Equipment (OPTIM), 2010 $12^{th}$ International Conference, Ma 22, 2010, pp. 321-328.

Yaskawa Technical Review, vol. 69, No. 2, AC Drive Drive, Sensorless Drive Technology for Permanent Magnet Synchronous Motor; http://www.yaskawa.co.jp/en/technology/tech_news/69-2/t10.htm, retrieved from the Internet 11-26-2-14, 1 pg.

Yim et al., "A Predictive Current Control Associated to EKF for High Performance IPMSM Drives"; Applied Power Electronics Conf. and Exposition (APEC), 2011; $26^{th}$ Annual IEEE, Mar. 6, 2011; pp. 1010-1016.

\* cited by examiner

CURRENT CONTROL OF MOTOR DRIVES WITH OUTPUT SINEWAVE FILTER

INCORPORATION BY REFERENCE

The following U.S. patents, patent applications and published patent applications are hereby incorporated by reference in their entireties: U.S. Pat. No. 9,124,209 issued Sep. 1, 2015 to Liu et al., entitled METHOD AND APPARATUS FOR CONTROLLING POWER CONVERTER WITH INVERTER OUTPUT FILTER; U.S. Patent Application Publication No. 2015/0123579 A1 to Liu et al., entitled METHOD AND APPARATUS FOR CONTROLLING POWER CONVERTER WITH INVERTER OUTPUT FILTER, and filed as U.S. patent application Ser. No. 14/555,769 on Nov. 28, 2014; U.S. Pat. No. 9,054,621 issued Jun. 9, 2015 to Liu et al., entitled POSITION SENSORLESS OPEN LOOP CONTROL FOR MOTOR DRIVES WITH OUTPUT FILTER AND TRANSFORMER; U.S. Patent Application Publication No. 2015/0194901 A1 to Liu et al., entitled POSITION SENSORLESS OPEN LOOP CONTROL FOR MOTOR DRIVES WITH OUTPUT FILTER AND TRANSFORMER, and filed as U.S. patent application Ser. No. 14/666,894 on Mar. 24, 2015; U.S. Pat. No. 9,054,611 issued Jun. 9, 2015 to Liu et al., entitled METHOD AND APPARATUS FOR STABILITY CONTROL OF OPEN LOOP MOTOR DRIVE OPERATION; U.S. Patent Application Publication No. 2015/0002067 A1 to Nondahl et al., entitled METHOD AND APPARATUS FOR STABILITY CONTROL OF OPEN LOOP MOTOR DRIVE OPERATION, and filed as U.S. patent application Ser. No. 14/193,329 on Feb. 28, 2014; U.S. patent application Ser. No. 14/565,781 filed Dec. 10, 2014 to Nondahl et al., entitled TRANSITION SCHEME FOR POSITION SENSORLESS CONTROL OF AC MOTOR DRIVES; U.S. patent application Ser. No. 15/014,360 filed Feb. 3, 2015 to Royak et al., entitled CONTROL OF MOTOR DRIVES WITH OUTPUT SINEWAVE FILTER CAPACITOR CURRENT COMPENSATION USING SINEWAVE FILTER TRANSFER FUNCTION; U.S. patent application Ser. No. 15/053,135 filed Feb. 25, 2016 to Nondahl et al., entitled SENSORLESS MOTOR DRIVE VECTOR CONTROL WITH FEEDBACK COMPENSATION FOR FILTER CAPACITOR CURRENT; and U.S. patent application Ser. No. 15/053,273 filed Feb. 25, 2016 to Nondahl et al., entitled SENSORLESS MOTOR DRIVE VECTOR CONTROL.

BACKGROUND INFORMATION

The subject matter disclosed herein relates to power conversion, and more specifically to controlling a power converter.

BRIEF DESCRIPTION

Various aspects of the present disclosure are now summarized to facilitate a basic understanding of the disclosure, wherein this summary is not an extensive overview of the disclosure, and is intended neither to identify certain elements of the disclosure, nor to delineate the scope thereof. Rather, the primary purpose of this summary is to present various concepts of the disclosure in a simplified form prior to the more detailed description that is presented hereinafter. The present disclosure provides power conversion systems, methods and computer readable mediums to operate an inverter to drive a motor load through an output filter, in which a control output value is computed according to a current reference value and a current feedback value using a proportional-integral (PI) current regulator, the control output value is filtered using a lag compensator filter to compute an inverter output command value, and the inverter is controlled according to the inverter output command value.

DETAILED DESCRIPTION

Figure 1:
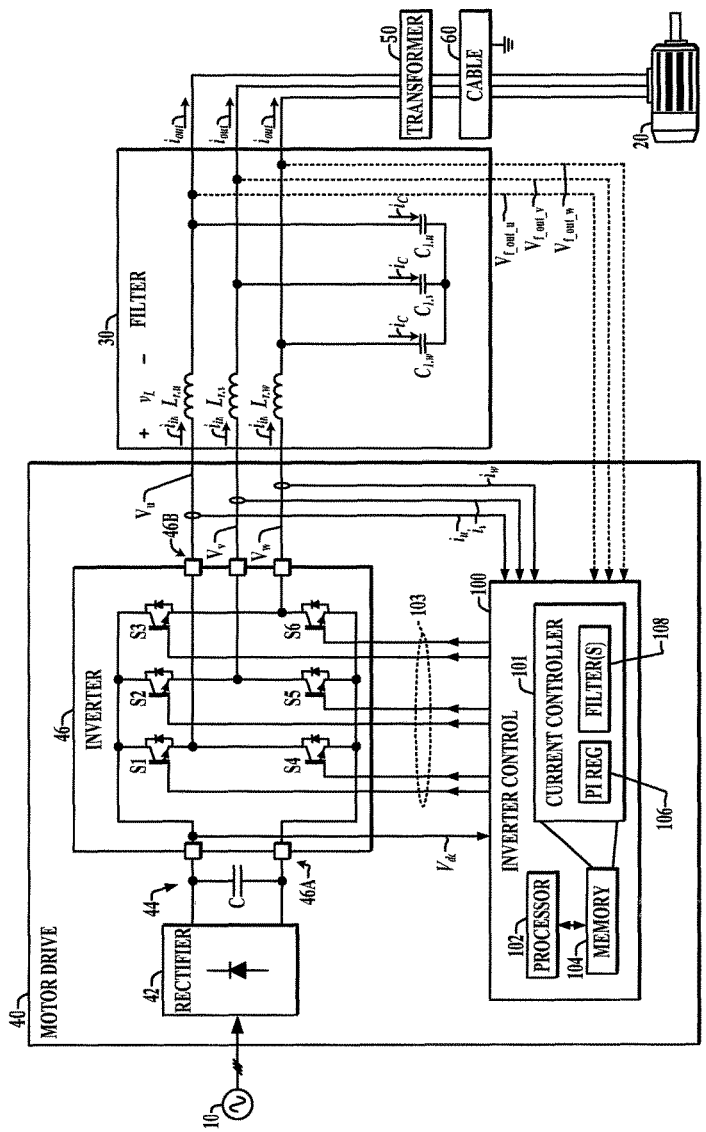
FIG. 1 is a schematic diagram of a motor drive power conversion system with an inverter driving a motor load through an output filter and a transformer.

Referring now to the figures, several embodiments or implementations are hereinafter described in conjunction with the drawings, wherein like reference numerals are used to refer to like elements throughout, and wherein the various features are not necessarily drawn to scale. FIG. 1 shows an example motor drive power conversion system 40 with an inverter 46 to drive an output load, such as a motor 20 through an intervening filter 30, referred to herein as an output filter or a sine wave filter. In certain implementations, as shown in FIG. 1, a transformer 50 can be connected between the output filter 30 and the driven motor load 20. Power conversion systems typically include an inverter stage to generate and provide AC output power to a load, such as a single or multi-phase AC motor. Pulse width modulated (PWM) output inverters provide output currents and voltages that include a number of pulses. Accordingly, output filters, such as sine wave filters with inductors and capacitors are sometimes employed between the inverter output and the driven load to reduce the high frequency content caused by pulse width modulation of the inverter switches. To control stability, output filters can be equipped with damping resistors in series with the filter capacitors.

However, filter damping resistors contribute to power loss in the system. Without on-board damping resistors, operation at or near a resonance frequency of a low damping output filter can lead to large oscillations and instability problems. Deep well pumping applications and other systems that have a motor driven through an output filter, a transformer and a potentially long motor cable often use voltage control as a function of frequency (V/Hz drives) which do not regulate currents and do not use position estimation for control. V/Hz drives typically suffer from higher drive and motor losses.

The disclosed techniques and apparatus facilitate current control using a current proportional-integral (PI) regulator with a lag compensator to filter the control output from the PI regulator and/or to filter a current feedback signal consumed by the PI regulator to operate an inverter of a motor drives with an output sine wave filter, a transformer, long cable, and motor. PI regulator together with one or multiple lag compensators further call PI controller. One or multiple first order lag compensator(s) can be designed based upon characteristics of the sine wave filter. In certain implementations, the filtering is implemented by one or more processors of a drive controller, and the lag compensation is tuned according to various parameters of the system, such as a current control loop resonance frequency of a current control loop, an inverter operating fundamental frequency, a peak resonance frequency of the output filter, a PI regulator corner frequency of the PI current regulator, a desired amplitude margin below unity at the resonance frequency of the current control loop, a desired current control loop crossover frequency of the current control loop, and a plant corner frequency. Certain embodiments can be successfully employed to facilitate accurate stable control of voltages and currents provided to the load in the presence of the output filter between the power conversion system and the load where the power delivered to the load is different from that delivered to the input of the filter. The output inverter stage of the motor drive in certain examples can be controlled according to feedback signals measured at the inverter output terminals, but these feedback values generally do not represent the currents or voltages ultimately provided to the load. Feedback sensors can be provided at the load itself for direct measurement of the load parameters, but this increases system cost, and may not be possible in all applications. The disclosed examples can be used, for example, in sensorless position control applications, such as deep well pump motor control where direct sensing of the motor load position and/or speed is difficult or impractical. In certain applications, a step-up transformer is used to boost the motor drive output voltage, allowing use of a low-voltage drive to power a medium voltage induction motor, and/or to reduce $I^2R$ losses and facilitate use of a smaller diameter cable wire for long cable runs between the motor drive and the driven motor. Certain applications also employ output filters between the motor drive inverter output and the transformer primary in order to suppress reflected wave voltage spikes associated with pulse width modulated (PWM) variable frequency drives. Use of sensorless voltage-frequency control techniques may lead to problems, particularly where a transformer and/or sine wave filter is connected between the motor drive and the motor load. Sensorless field-oriented-control (FOC) or other open loop speed control techniques have thus far been largely unsuitable for low-speed motor drive operation where output filters and transformers are used, such as in electric submersible pumps (ESPs), and these difficulties are particularly problematic in driving permanent magnet synchronous motors (PMSMs). Moreover, motors in sensorless speed control applications also suffer from oscillation in rotor velocity about the setpoint speed following load transitions or speed setpoint adjustments, particularly at low speeds. In certain situations, moreover, the driven motor may be unable to start successfully from a stopped condition due to unstable motor speed oscillations. Furthermore, operation at high speeds is sometimes prevented or inhibited by the resonant frequency of the connected output filter. In this regard, conventional motor drives and control techniques often suffer from instability problems at high motor speeds.

As seen in FIG. 1, disclosed examples include power conversion systems 40, inverter control methods and controllers or control apparatus 100 to drive a motor load 20 through an intervening filter 30, which can also be used in combination with a transformer 50 and a potentially lengthy cables 60 coupled between the filter output and the driven motor load 20. FIG. 1 shows a motor drive power conversion system 40 with an inverter 46 and an inverter controller 100 configured to control current of a driven motor load 20 based on sensed or computed inverter output current signals or values $i_u$, $i_v$, $i_w$ representing output currents flowing at an AC output 46B of the inverter 46. The controller 100, moreover, is configured to compensate for the presence of an output filter 30 connected between the motor drive output 46B and the driven motor 20 using a current controller 101. In particular, the inverter controller 100 in one example includes a processor 102 and an associated electronic memory 104 which stores program instructions to implement a current controller 101 including one or more proportional-integral (PI) regulators or PI control components 106, and one or more filters 108.

The motor drive 40 receives single or multiphase AC input power from a power source 10 and converts this to a DC bus voltage using a rectifier 42 which provides a DC output voltage to a DC link circuit 44 having a capacitor C. The rectifier 42 can be a passive rectifier including one or more diode rectifier components, or may be an active front end (AFE) system with one or more rectifier switching devices (e.g., IGBTs, etc.) and an associated rectifier controller (not shown) for converting input AC electrical power to provide the DC bus voltage in the link circuit 44. Other configurations are possible in which the drive 40 receives input DC power from an external source (not shown) to provide an input to the inverter 46, in which case the rectifier 42 may be omitted. The DC link circuit 44 may include a single capacitor C or multiple capacitors connected in any suitable series, parallel and/or series/parallel configuration to provide a DC link capacitance across inverter input terminals 46A. The illustrated motor drive 40 is a voltage source converter configuration including one or more capacitive storage elements in the DC link circuit 44. The various concepts of the present disclosure may be implemented in association with current source converter architectures in which a DC link circuit 44 includes one or more inductive storage elements, such as one or more series-connected inductors situated between the source of DC power (e.g., rectifier 42 or external DC source) and the input 46A of the inverter 46. In other possible implementations, the motor drive 40 includes a direct DC input to receive input power from an external source (not shown), and in certain embodiments the rectifier 42 and DC link circuit 44 may both be omitted.

The DC input 46A of the inverter 46 includes first and second (e.g., plus and minus) terminals connected to the DC link circuit 44, as well as a plurality of switching devices S1-S6 coupled between the DC input 46A and the motor drive AC output 46B. In operation, the inverter switching devices S1-S6 are actuated by inverter switching control signals 101 provided by the controller 100 to convert DC electrical power received at the DC input 46A to provide AC electrical output power as inverter output voltages, $V_u$, $V_v$, and $V_w$ and inverter output currents $i_u$, $i_v$, and $i_w$ at the AC output 46B. The filter circuit 30 receives the AC output from the inverter 46 of the motor drive 40. Although illustrated as driving a permanent magnet synchronous motor 20, the motor drive 40 can be employed in connection with other types of AC motor loads 20 and/or other forms of power converters to drive non-motor loads 20 using an output inverter 46. One or more feedback signals or values may be provided from the motor 20 itself, including a motor (e.g., rotor) position or angle signal $\theta_r$ and a motor speed or velocity signal co, although not a strict requirement of all embodiments of the present disclosure. The concepts of the present disclosure advantageously facilitate the sensorless speed estimation by the inverter controller 100, and thus direct feedback from the driven motor load 20 is not required in all implementations. The motor drive 40 in certain embodiments implements a motor speed and/or position and/or torque control scheme in which the inverter controller 100 selectively provides the switching control signals 101 in a closed and/or open-loop fashion according to one or more setpoint values such as a motor speed setpoint. The setpoint in one example is a signal or value generated by the controller 100, or a fixed setpoint value, or such setpoint value can be received from an external system (not shown). In practice, the motor drive 40 may also receive a torque setpoint and/or a position (e.g., angle) setpoint, and such desired signals or values (setpoint(s)) may be received from a user interface and/or from an external device such as a distributed control system, etc. (not shown). As used herein, a signal can be an analog signal, such as a current or a voltage signal, or a signal can include digital values generated or consumed by the processor 102.

The inverter 46 of the motor drive 40 is connected to the load 20 through the intervening filter circuit 30. In the example of FIG. 1, the filter 30 is an "L-C" configuration in which each of the power converter output lines is connected to the motor through a series-connected filter inductor $L_r$ ($L_{r,u}$, $L_{r,v}$ and $L_{r,w}$ in the illustrated example). This example includes a corresponding filter capacitor $C_1$ connected between the corresponding motor line and a common connection point (a neutral of a Y-connected set of filter capacitors $C_{1,u}$, $C_{1,v}$ and $C_{1,w}$ in the illustrated example). Other implementations are possible, in which the filter capacitors $C_1$ are connected in a "Delta" configuration. In the illustrated (Y-connected) configuration, the filter circuit neutral point can be optionally connected to a circuit ground or other, connection point associated with the motor drive 40, although not a strict requirement of the present disclosure. The disclosed apparatus and techniques can be employed in connection with other forms and types of filter circuits 30, including without limitation L-C-L circuits, etc.

The output of the filter circuit 30 provides motor phase currents $i_{out}$ to control the motor load 20. The filter capacitor currents $i_C$ flow in the filter capacitors $C_1$ and non-zero voltages $v_L$ (i.e., filter voltages) may develop across one or more of the filter inductors $L_r$, whereby simple closed-loop control based on measured inverter output current signals or values $i_u$, $i_v$, $i_w$ may result in less than optimal operation of the driven load 20. At the same time, however, directly measuring the motor currents $i_{out}$ and/or motor voltages would require additional hardware and cabling, which may not be economically feasible or technically possible in certain applications. Nevertheless, for those cases where motor currents and/or motor voltages, such as $V_u$, $V_v$, $V_w$, $V_{f\_out\_u}$, $V_{f\_out\_v}$, and $V_{f\_out\_w}$ in FIG. 1, are measured, those signals can be used to enhance or replace the inverter current and/or voltage signals in the computation of the compensation signals. Certain embodiments of the inverter controller 100, however, advantageously provide steady-state compensation with respect to capacitor current based on the plant transfer function or functions 110, 112, 114 independent of the voltage feedback information. As seen in FIG. 1, moreover, the illustrated drive 40 may also include one or more current sensors configured to measure, sense, or otherwise detect at least one inverter output feedback signal or value (e.g., output currents $i_u$, $i_v$, $i_w$) which represent the output current at the AC output 46B of the inverter 46. The inverter controller 100 thus accommodates the presence of the filter circuit 30 (e.g., and any optionally included transformer 50 and potentially lengthy motor cable 60) between the motor drive output 46B and the driven motor load 20, without requiring addition of external sensors to sense the actual conditions at the motor load 20.

The controller 100 and the components thereof may be any suitable hardware, processor-executed software, processor-executed firmware, logic, or combinations thereof that are adapted, programmed, or otherwise configured to implement the functions illustrated and described herein. The controller 100 in certain embodiments may be implemented, in whole or in part, as software components executed using one or more processing elements, such as one or more processors 102. The controller 100 may be implemented as a set of sub-components or objects including computer executable instructions stored in the electronic memory 104 for operation using computer readable data executing on one or more hardware platforms such as one or more computers including one or more processors, data stores, memory, etc. The components of the controller 100 may be executed o the n the same computer processor or in distributed fashion in two or more processing components that are operatively coupled with one another to provide the functionality and operation described herein.

Figure 2:
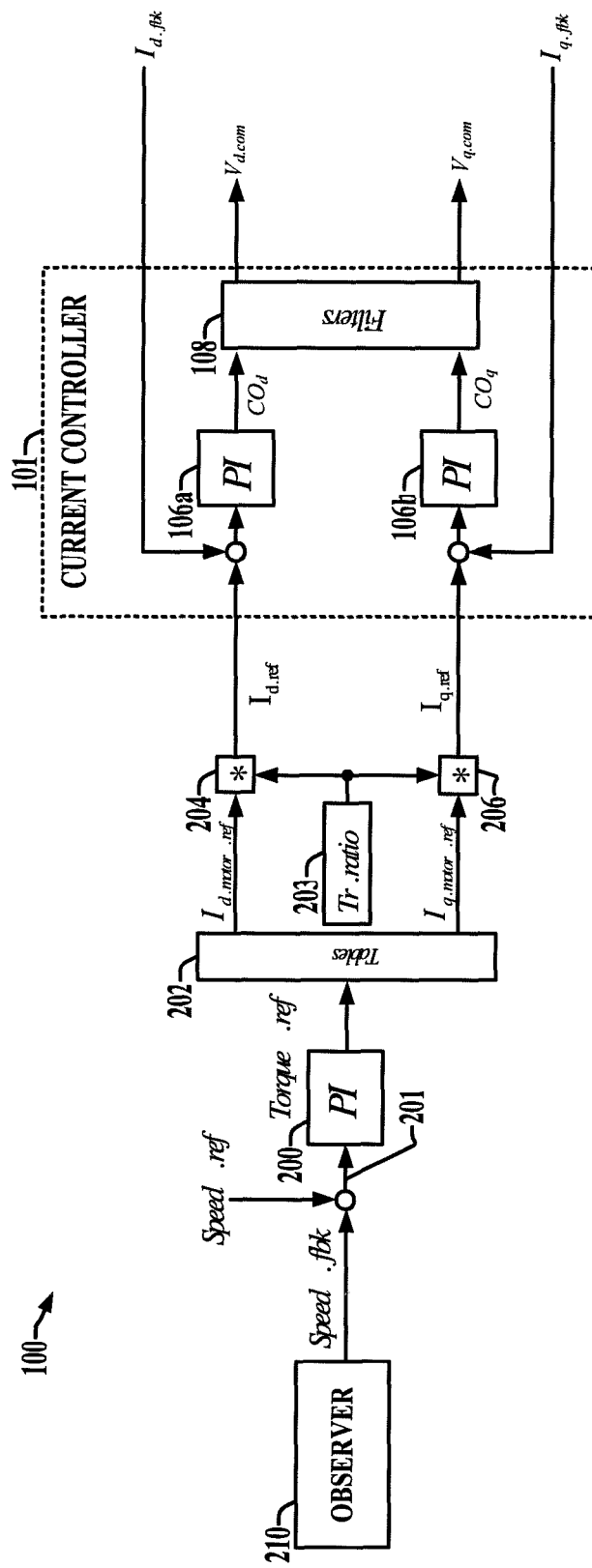
FIG. 2 is a schematic diagram of motor control and motor speed estimation components of the motor controller in FIG. 1.
Figure 3:
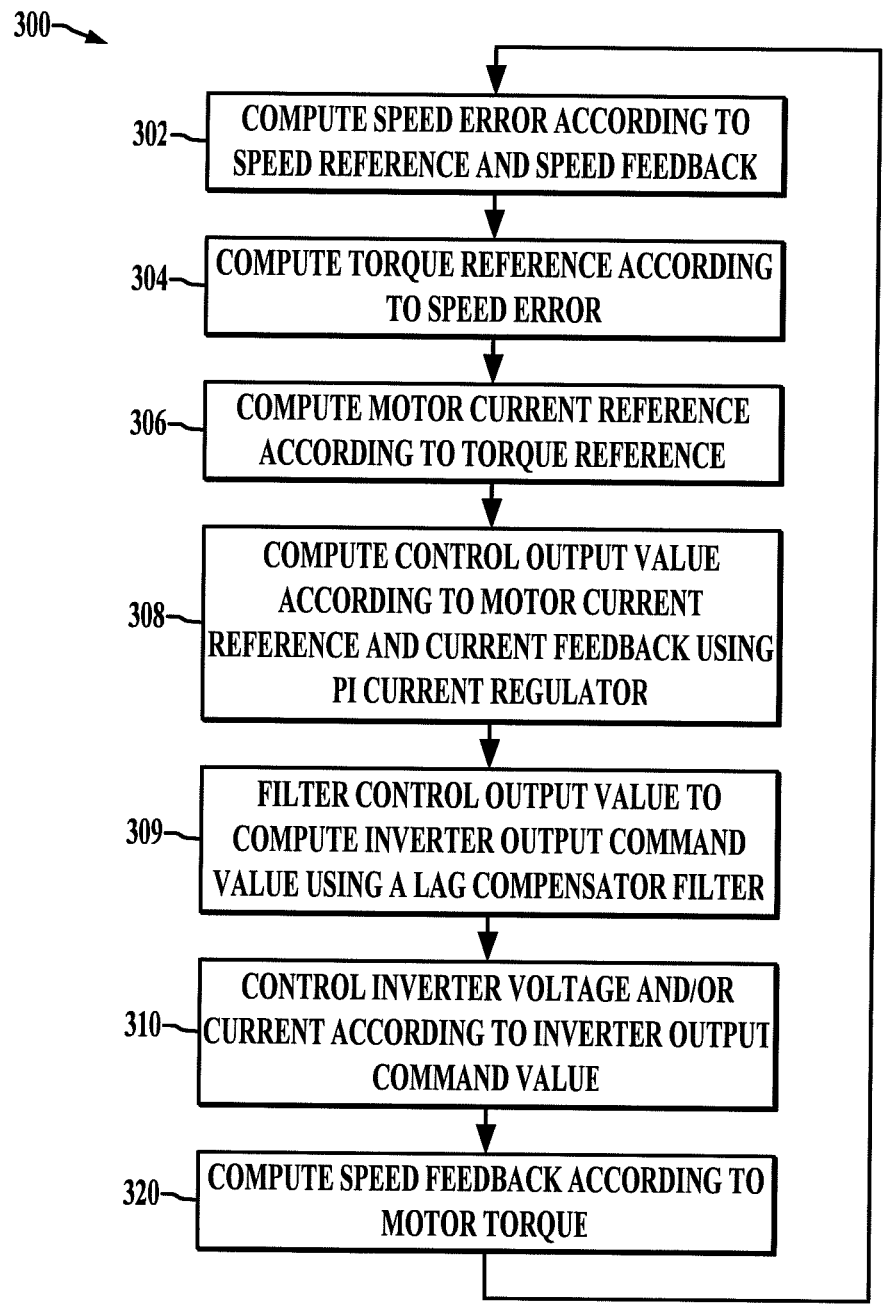
FIG. 3 is a flow diagram illustrating a method to control an inverter to drive a motor load through an intervening filter in the apparatus of FIGS. 1 and 2.
Figure 4:
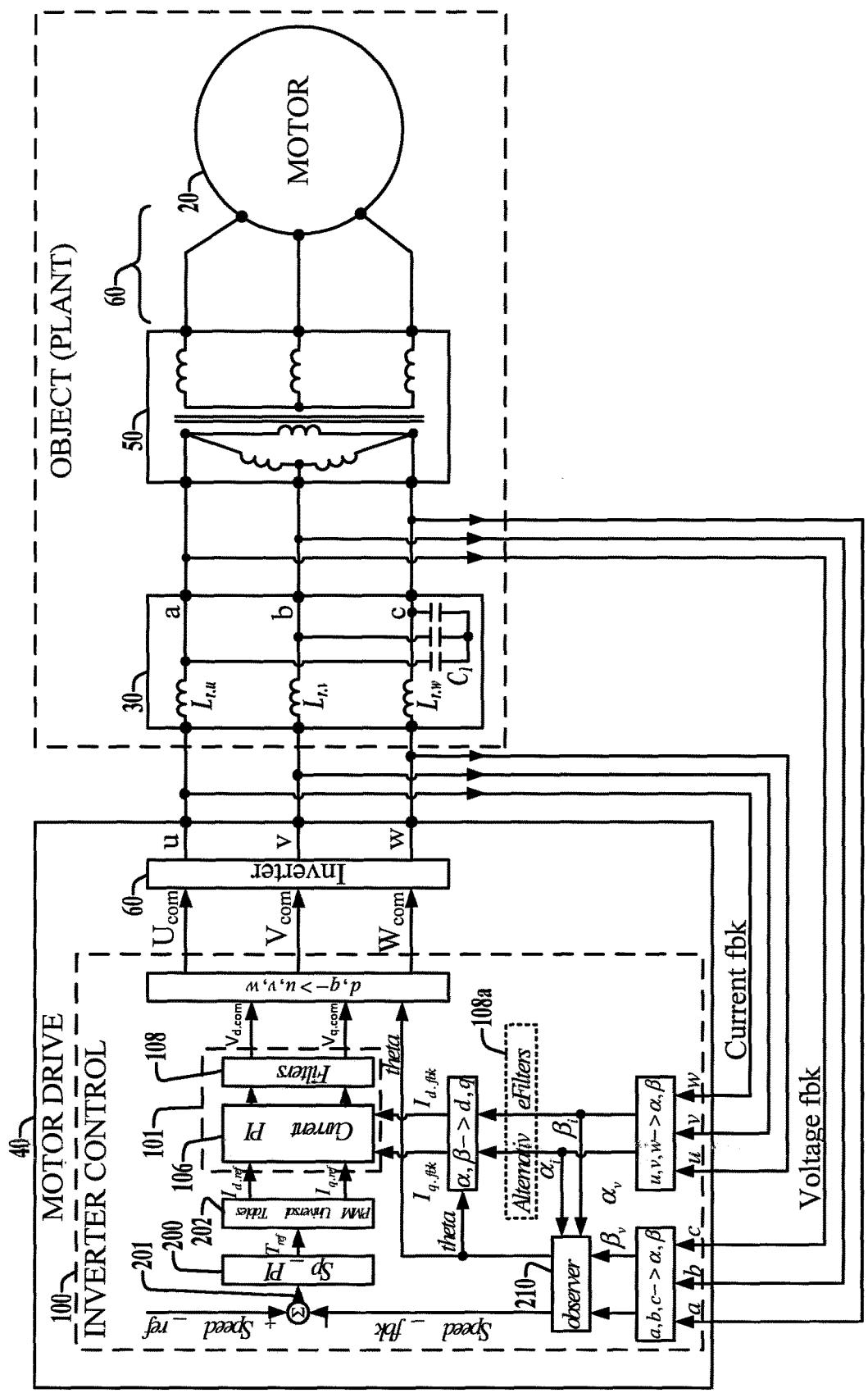
FIG. 4 is a schematic diagram of an example motor drive power conversion system showing details of an example inverter controller with a current PI regulator and filters.

Referring also to FIGS. 2-4, FIG. 2 illustrates filter transfer functions, motor control and motor speed estimation components of the motor controller 100 in the motor drive 40 of FIG. 1. Disclosed examples include power conversion systems, methods and computer readable mediums to operate an inverter 46 to drive a motor load 20 through an output filter 30, in which a control output value $CO_{d,q}$ is computed according to a current reference value $I_{d,q\_ref}$ and a current feedback value $I_{d,qfbk}$ using a proportional-integral PI current regulator 106. The control output value $CO_{d,q}$ is filtered using a lag compensator filter 108 to compute an inverter output command value $V_{d,q.com}$, and the inverter 46 is controlled according to the inverter output command value $V_{d,q.com}$. FIG. 3 illustrates a process or method 300 of operating the motor drive inverter 46 to drive a motor load 20 through an intervening filter 30, which can be implemented in the motor controller 100. The controller 100 implements a closed loop control algorithm including one or more proportional-integral (PI) control components or regulators 106 and filter component(s) 108 of a current controller 101 in order to control the driven load 20. The controller 100 in certain embodiments is configured by execution in the processor 102 of instructions in the memory 104 to implement the control configuration illustrated in FIG. 2, as described hereinafter in conjunction with the process 300 of FIG. 3.

The controller 100 is configured to implement the method 300, wherein the processor 102 of FIG. 1 computes a speed error value 201 at 302 according to a speed reference value Speed.ref and a speed feedback value Speed.fbk, and at 304 computes a torque reference value Torque.ref according to the speed error value 201. At 302 in one possible implementation, the controller 100 computes 302 a speed error value 201 according to a speed reference value Speed.ref and a speed feedback value Speed.fbk, for example, by subtracting the feedback value from the reference value. The feedback value can be obtained from any suitable source, including actual speed sensors (not shown) or from a speed observer 210 as shown in FIG. 2. As seen in FIG. 2, the controller 100 implements a speed proportional-integral (PI) control component 200 which receives the resulting speed error signal 201 and operates according to known proportional-integral control operation to compute a torque reference value Torque.ref according to the speed error value 201 at 304 in FIG. 3.

At 306, the processor 102 computes a current reference value $I_{d,q.ref}$ according to the torque reference value Torque.ref. At 306, the controller 100 uses one or more lookup tables 202 or solves one or more parametric equations (not shown) to compute one or more motor current reference values. In the example of FIG. 2, the controller 100 computes d and q axis motor current reference values Id.motor.ref and Iq.motor.ref according to the torque reference value Torque.ref, where this computation in certain examples includes indexing a lookup table 202. In this example, moreover, the controller 100 scales the d and q axis motor current reference values Id.motor.ref and Iq.motor.ref according to a turns ratio 203 of any included output transformer 50 via multiplier components 204 and 206, respectively. Other implementations are possible that do not involve speed and/or torque control, in which case the computations at 302, 304 and 306 can be omitted.

At 308, the control processor 102 computes a control output value $CO_{d,q}$ according to a current reference value $I_{d,q.ref}$ and a current feedback value $I_{d,qfbk}$ using a proportional-integral PI current regulator 106 implemented by the controller 100. At 309 the processor 102 filters the control output value $CO_{d,q}$ to compute an inverter output command value $V_{d,q.com}$ using the lag compensator filter 108 implemented by the controller 100. In certain examples, the PI regulator(s) 106 and the lag compensator filter(s) are implemented as programmable instructions stored in the memory 104 to be executed by the processor 102.

At 310 in FIG. 3, the processor 102 provides the inverter switching control signals 101 to control 310 the inverter 46 according to the inverter output command value $V_{d,q.com}$ to control the inverter 46 according to the inverter output current reference value(s) Id,q.inverter.ref. The controller 100 computes or estimates the speed feedback value Speed.fbk according to any suitable measured or inferred value, such as inverter currents and voltages in one example. In another example, the controller uses sensor information for the speed feedback. Moreover, the controller 100 in certain embodiments implements sensorless speed control according to the estimated speed feedback value Speed.fbk without requiring speed feedback. For instance, the controller 100 can implement sensorless speed and/or position control including computing a speed feedback value at 320 in FIG. 3 according to the motor torque, and the process 300 repeats at 302 as described above.

As shown in FIG. 4, in certain examples the current controller 101 includes one or more of current PI regulators 106 followed by one or more filters 108. The filters 108 include one or more first order lag compensators as described further below to filter the control output provided by the current PI regulator(s) 106 in order to provide one or more voltage command values for use in operating the inverter 60. In other examples, as shown in dashed line in FIG. 4, the filter or filters 108a, including one or more first-order lag filters, can be implemented in a current feedback loop to filter a current feedback value or values in order to provide a filtered current feedback value or values to the PI regulator(s) 106. In certain embodiments, the controller 100 implements voltage control. In the example of FIG. 2, the controller 100 controls the inverter 46 according to the inverter output current reference value $I_{d,q.inverter.ref}$. In one example, the controller 100 computes an inverter output voltage control value $V_{in.d,q}$, for example, d and q values $V_{in.d}$ and $V_{in.q}$ computed using voltage control PI components 212 and 214, respectively, according to the inverter output current reference value(s) $I_{d,q.inverter.ref}$ and an inverter output current value(s) $I_{d,q.in}$. In certain examples, the inverter output current value or values $I_{d,q.in}$ (e.g., $I_{d.in}$ and $I_{q.in}$) can be obtained from feedback sensors (e.g., as shown in FIG. 1 above), or these can be computed by the controller 100. The controller 100 provides the inverter switching control signals 101 at 310 in this example to control the inverter 46 according to the inverter output voltage control value(s) $V_{in.d,q}$.

In other possible implementations, the controller 100 operates to control the inverter 46 according to the inverter output current reference value(s) $I_{d,q.inverter.ref}$. In this case, the controller 100 computes the inverter output current value(s) $I_{d,q.in}$ according to the inverter output current reference value $I_{d,q.inverter.ref}$ and the inverter output current value $I_{d,q.in}$, and provides the inverter switching control signals 101 to control the inverter 46 (e.g., at 310 in FIG. 3) according to the inverter output current value $I_{d,q.in}$. In this example, the PI controllers 212 and 214 provide the computed inverter output current value(s) $I_{d,q.in}$.

The lag compensator filter 108 in certain examples includes one or more lag compensators designed according to a current control loop resonance frequency $\omega_{d,q.res}$ of a current control loop, an inverter operating fundamental frequency $\omega_{fund}$, a peak resonance frequency $\omega_{pk}$ of the output filter 30, a PI regulator corner frequency $\omega_{ld}$ of the PI current regulator 106, a desired amplitude margin 1010, 1110 below unity at the resonance frequency $\omega_{d,q.res}$ of the current control loop, a desired current control loop crossover frequency $\omega_{co}$ of the current control loop, and a plant corner frequency $\omega_{\Sigma}$. Moreover, the drive 40 and the controller 100 are programmable to adapt to different filter and/or driven motor combinations.

Referring now to FIGS. 4-11, non-limiting example lag compensation concepts are described hereinafter, which can be employed as the post-PI regulator filters 108 in FIGS. 1-4 and/or as alternative feedback filters 108a as shown in FIG. 4. FIG. 4 shows the general system block diagram with a sinewave filter 30, a transformer 50, a potentially lengthy cable 60 and a motor 20, which can be used in deep well oil pump applications, for example.

Figure 5:
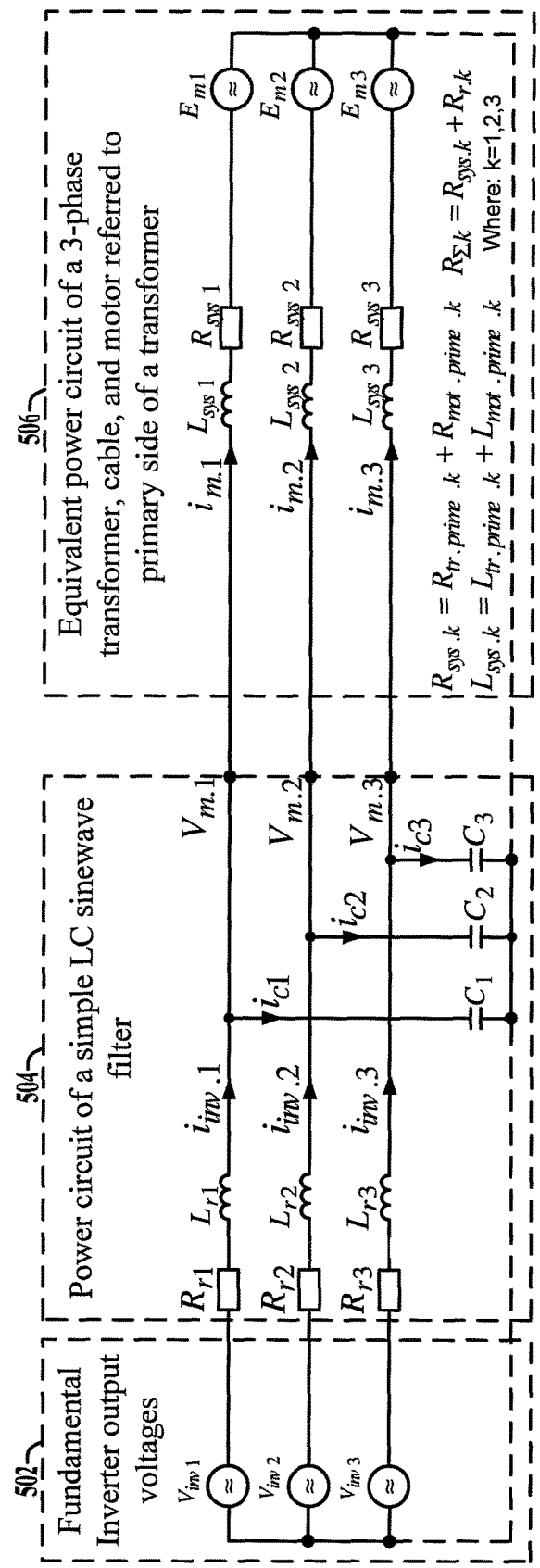
FIG. 5 is a schematic diagram of a system equivalent electrical circuit corresponding to the motor drive power conversion system of FIG. 4.

FIG. 5 shows a system equivalent electrical circuit including fundamental inverter output voltages 502, a power circuit of a simple LC sinewave filter 504, and an equivalent power circuit of a three-phase transformer, cable and motor referred to the primary side of the transformer shown at 506. In this system, a system resistance $R_{sys.k}$ is given as $R_{sys.k}=R_{tr.prime.k}+R_{cbl.prime.k}+R_{mot.prime.k}$. A summation resistance $R_{\Sigma.k}$ is given as $R_{\Sigma.k}=R_{sys.k}+R_{r.k}$. In addition, system and summation inductances are given as $L_{sys.k}=L_{tr.prime.k}+L_{cbl.prime.k}+L_{mot\ prime.k}$; and $L_{\Sigma.k}=L_{sys.k}+L_{r.k}$ where k=1, 2, 3.

The following presents an analysis of a current control loop implemented in the controller 100 for operation of the inverter 46 in combination with an output sinewave filter 30. The output filter 30, as previously mentioned, does not include any damping resistors, and thus has a low damping factor and relatively low resonance frequency $\omega_{pk}$ (e.g., the resonance frequency $\omega_{pk}$ is not far from required current loop frequency crossover).

Figure 6:
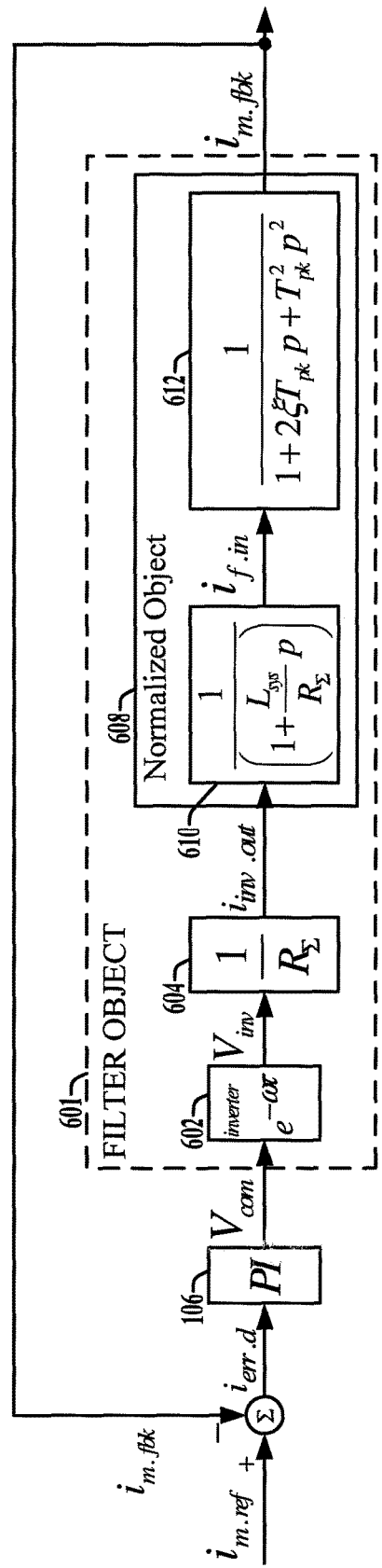
FIG. 6 is a schematic diagram of the closed loop current control loop in the system of FIGS. 4 and 5.

FIG. 6 illustrates a general closed loop with the current PI regulator 106 providing a command signal to a filter object 601 with an inverter object 602, a summation resistance component 604, and a normalized object 608 including a first order filter component 610 and a second order filter component 612. The use of a low damping second order unit in the object 612 allows the object transfer function to be represented as follows (see also FIGS. 4, 5):

$$H_{object}(p) = \frac{i_{m.fbk}(p)}{V_{inv}(p)} = \frac{1}{R_\Sigma} \cdot \frac{1}{1 + \frac{1}{\omega_\Sigma} \cdot p} \cdot \frac{1}{1 + 2\xi T_{pk} p + T_{pk}^2 p^2} \quad (1)$$

where "$\omega_\Sigma$" is a plant corner frequency given according to the following formulas, where $T_{pk}$ is the time constant of the output filter 30, C is the filter capacitance, $L_r$ is the inductance of the filter inductors, and $R_r$ is the resistance of the filter inductors:

$$\omega_\Sigma = \frac{R_\Sigma}{L_{sys}} \quad (2)$$

$$2\xi T_{pk} = CR_r \quad (3)$$

$$T_{pk}^2 = CL_r \quad (4)$$

From equations 3 and 4, the following equations can be derived for the time constant $T_{pk}$ and a damping factor $\xi$:

$$T_{pk} = \frac{1}{\omega_{pk}} = \sqrt{CL_r} \quad (5)$$

$$\xi = \frac{R_r}{2} \cdot \sqrt{\frac{C}{L_r}} \quad (6)$$

where "$\xi$" and "$\omega_{pk}$" are filter damping factor and filter resonance frequency, respectively. A typical range of the damping factor "$\xi$" for a standard sinewave filter is 0.01-0.0005, and a typical range of a resonance frequency "$\omega_{pk}$" for a standard filter is 800-1,100 Hz. The amplitude of the resonance peak "$A_{pk}$" at the point of the resonance frequency "$\omega_w pk$" can be calculated as follows:

$$A_{pk}(\omega_{pk}) = \frac{1}{2 \cdot \xi} \quad (7)$$

$$\omega_{pk} = \frac{1}{T_{pk}} \quad (8)$$

According to the damping factor range, the amplitude of the resonance peak "$A_{pk}$" is given in one example by the following:

$$A_{pk} = \frac{1}{2 \cdot \xi} = \frac{1}{2(0.01 - 0.0005)} = 50 - 1000 \quad (9)$$

Or in a decibel units:

$$20 \cdot \log(A_{pk}) = 20 \cdot \log(50-500) = (34-60) \text{ db} \quad (10)$$

Figure 7:
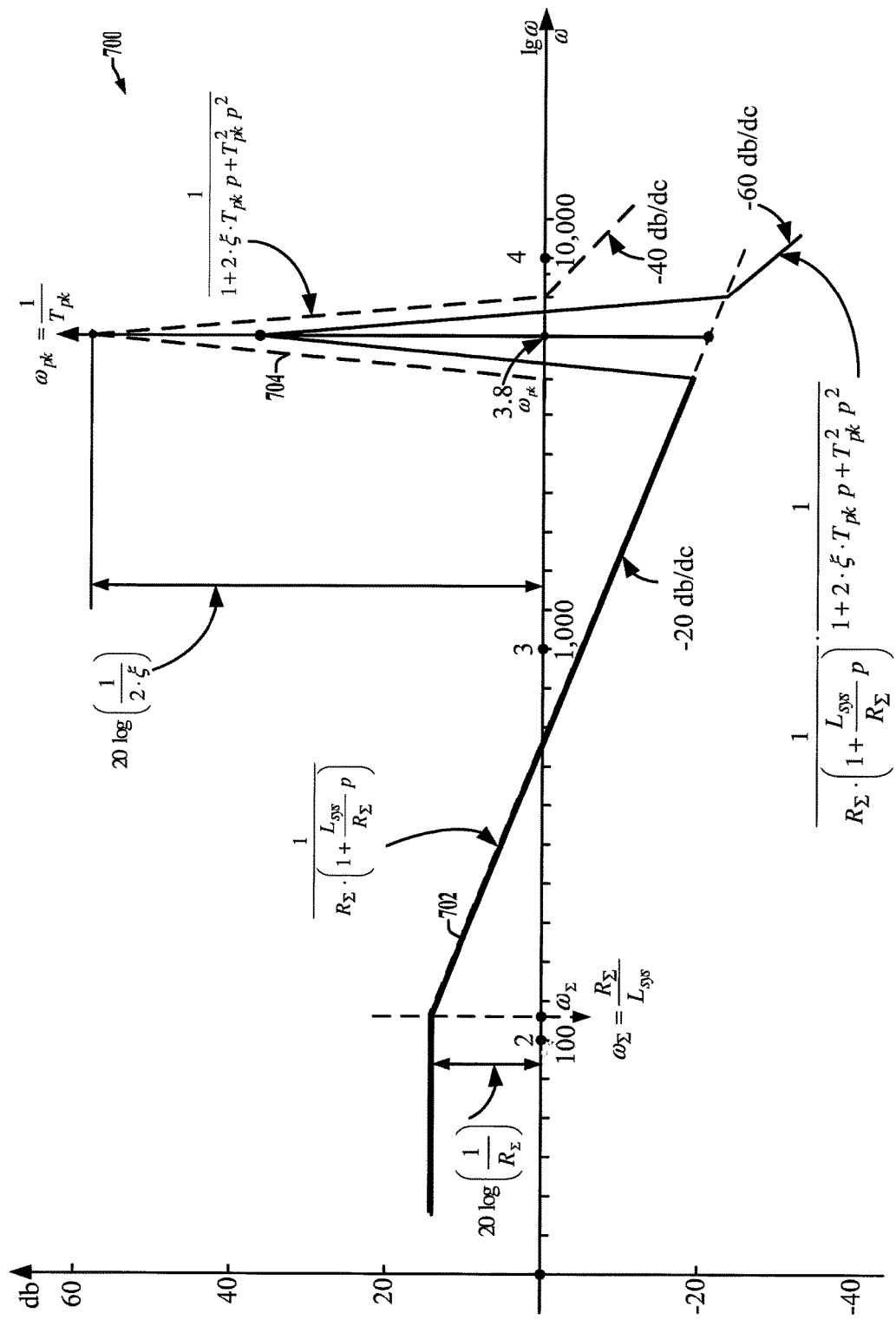
FIG. 7 is a graph showing a magnitude log-log Bode plot of the transfer function of the system of FIG. 6 for an inverter operating fundamental frequency of zero.

FIGS. 6 and 7 show typical Bode log-log amplitude plots for the object. The control algorithm in one example of FIG. 4 works with "d, q" variables, and the controller 100 implements corresponding coordinate transformation blocks shown in FIG. 4. Generally, these blocks make a variables transformation from "a, b, c" or "u, v, w" to "α, β" and then from "α, β" to "d, q". The resonance frequency "$\omega_{pk}$" of the sinewave filter 30 is shown inside the rotational frames "a, b, c", "u, v, w", or "α, β", but any Bode plot is created inside a synchronous frame "d, q". Therefore resonance frequency of sinewave filter "$\omega_{pk}$" is equal to the value of equations 5, 8 above. The "d, q" resonance frequency $\omega_{d,q.res}$ inside the Bode plot will move according to the fundamental frequency $\omega_{fund}$ (i.e., the electrical operating frequency of the inverter 46) since the synchronous frame is rotating with the fundamental frequency. Therefore, the "d, q" resonance frequency $\omega_{d,q.res}$ can be calculated as follows:

$$\omega_{d,q.res} = \omega_{pk} - \omega_{fund} \quad (11)$$

Figure 8:
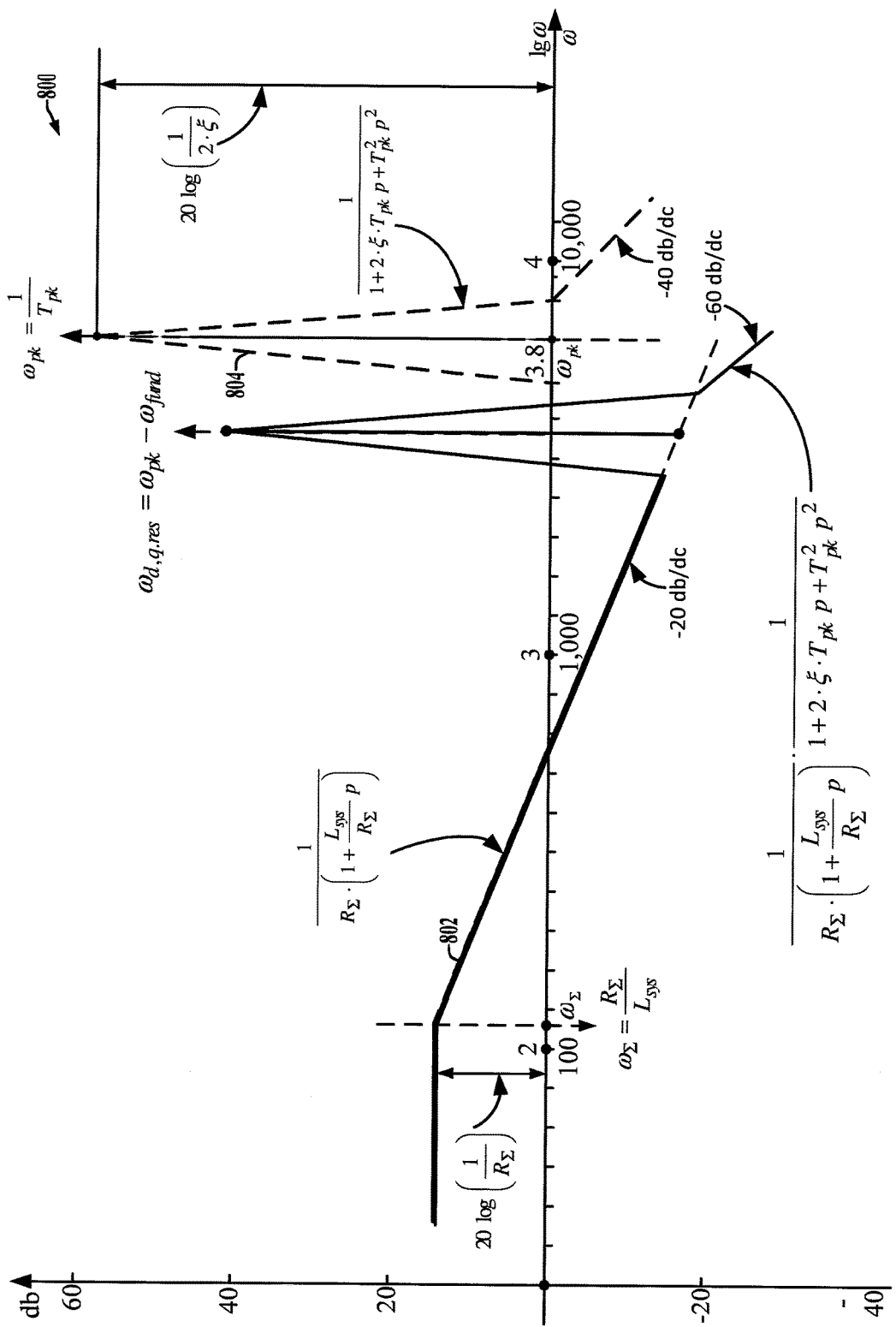
FIG. 8 is a graph showing a magnitude log-log Bode plot for a non-zero inverter operating fundamental frequency.
Figure 9:
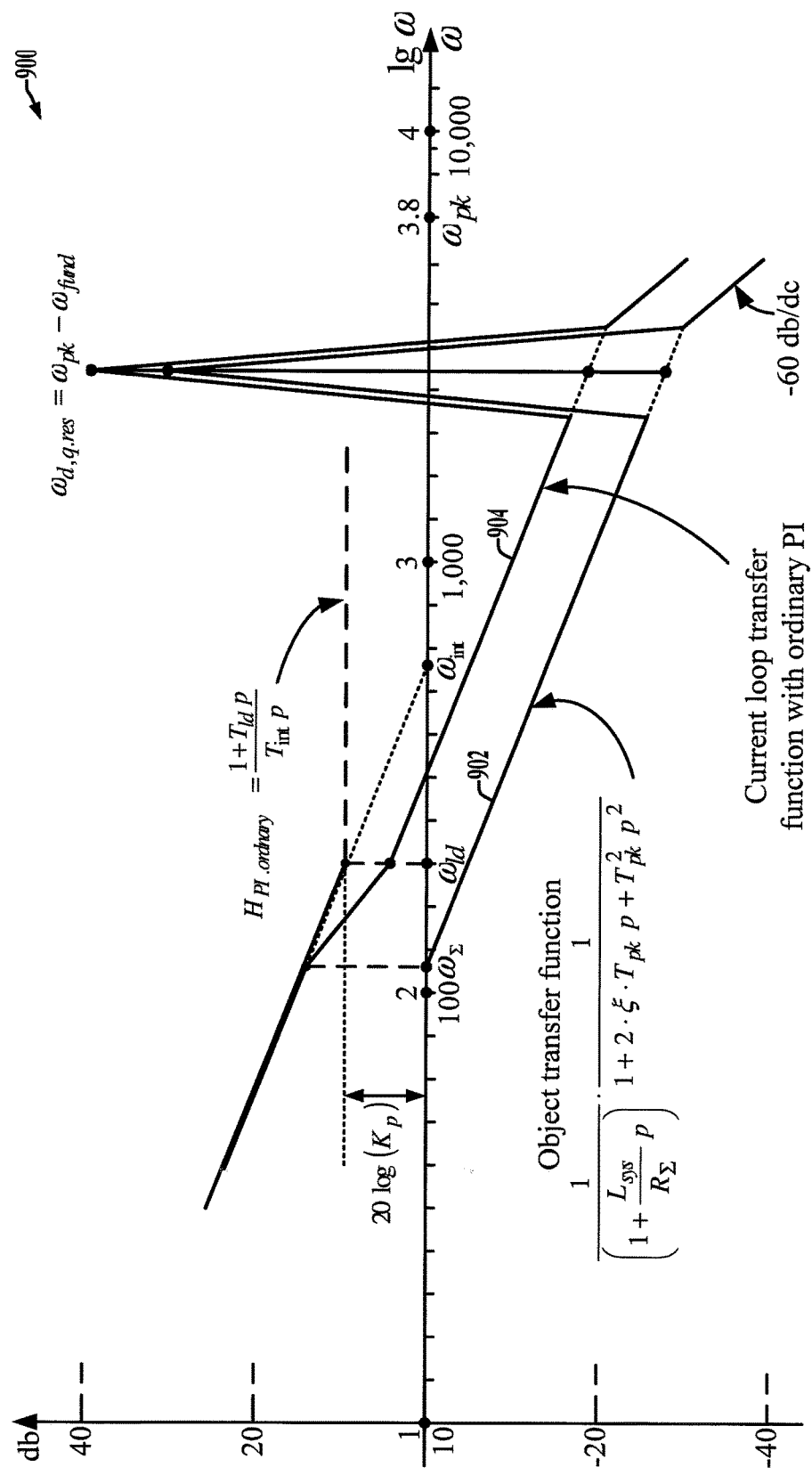
FIG. 9 is a graph showing a magnitude log-log Bode plot curves for the system object of FIG. 6 and the current control open loop with ordinary PI regulator.
Figure 10:
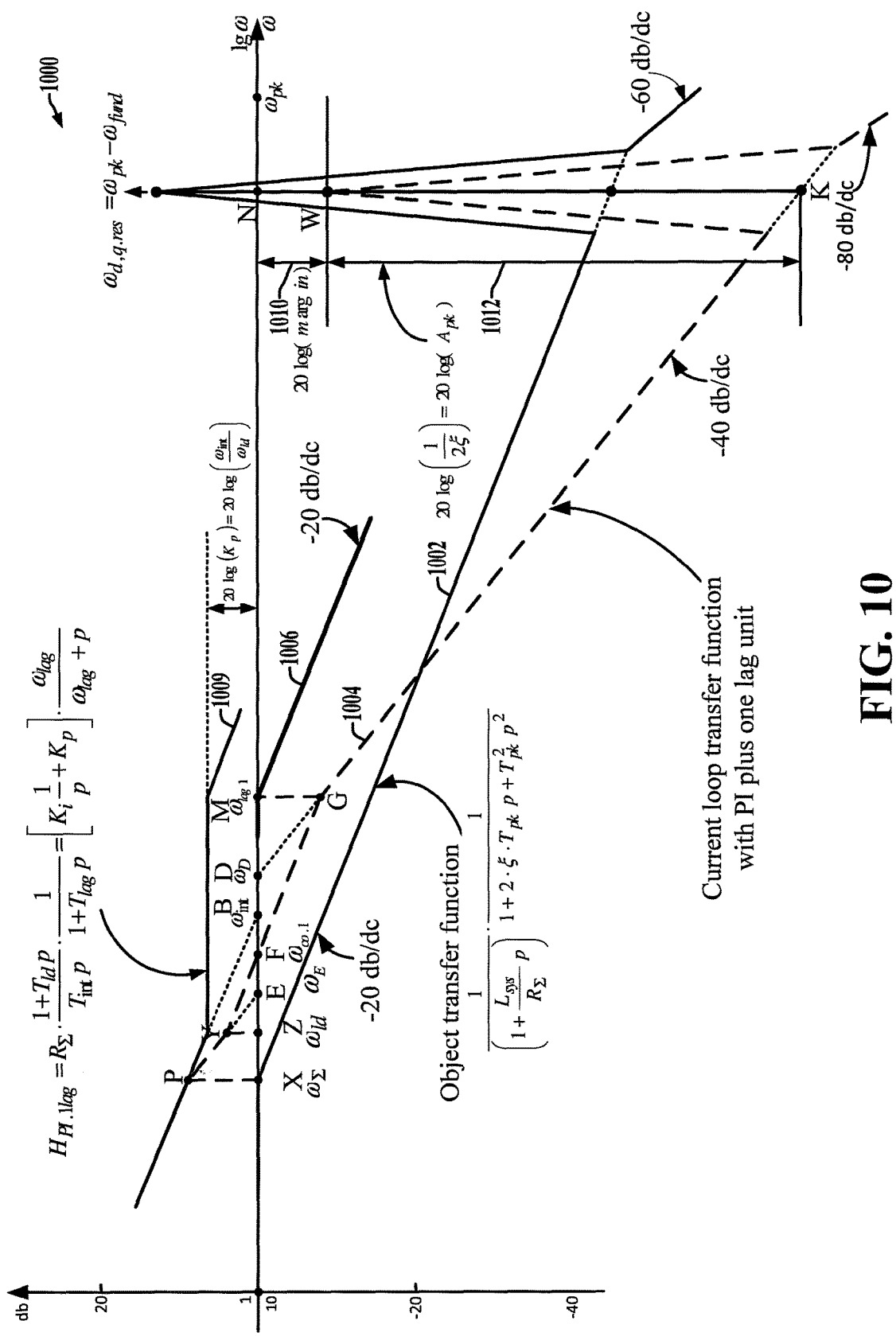
FIG. 10 is a graph showing a magnitude log-log Bode plot curves for the system object of FIG. 6 and the current control open loop with PI controller of FIG. 4 including a single lag filter.
Figure 11:
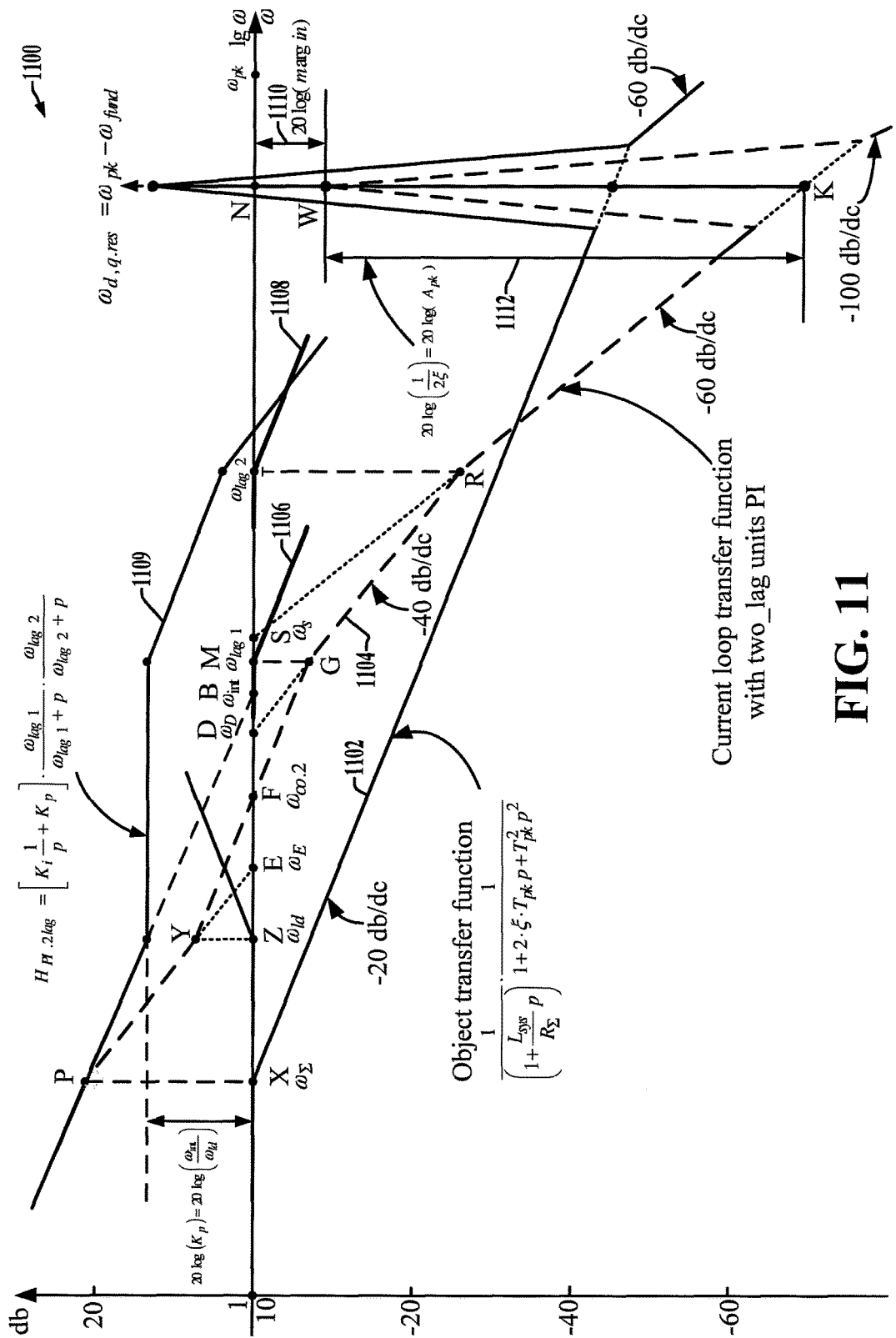
FIG. 11 is a graph showing a magnitude log-log Bode plot curves for the system object of FIG. 6 and the current control open loop with PI controller of FIG. 4 including two lag filters.

FIG. 7 is a graph 700 showing a log-log Bode plot curve 702 of the magnitude log-log transfer function of the system of FIG. 6 for the object transfer function of an inverter operating fundamental frequency of zero. FIG. 8 provides a graph showing a log-log Bode plot curve 802 for a non-zero inverter operating fundamental frequency for the object transfer function, as well as a curve 804 showing the magnitude log-log transfer function performance of the second order part of output filter 30. FIG. 9 provides a graph 900 showing a magnitude log-log Bode plot curves 902 for the system object of FIG. 6 and the entire current control loop with PI 904. FIG. 10 includes a graph 1000 showing magnitude log-log Bode plot curve 1002 for the system object of FIG. 6 and a curve 1004 the entire current control loop with PI of FIG. 4 including a single lag filter. FIG. 11 shows a graph 110 including a magnitude log-log Bode plot curve 1102 for the system object of FIG. 6 and a magnitude log-log curve 1104 for the entire current control loop with PI of FIG. 4 including two lag filters.

As seen in FIG. 7, the PI regulator 106 implements a regulation function according to a proportional constant $K_p$ and an integral constant $K_i$, and has the following transfer function:

$$H_{PI\text{-}ordinary} = R_\Sigma \cdot \frac{1 + T_{ld}}{T_{int} p} = R_\Sigma \cdot [K_{i\text{-}norm} p + K_{p\text{-}norm}] \quad (12)$$

$$K_{i\text{-}norm} = \frac{1}{T_{int}} = \omega_{int} \quad (13)$$

$$K_{p.norm} = \frac{T_{ld}}{T_{int}} = \frac{\omega_{int}}{\omega_{ld}} \quad (14)$$

Stabilizing the current control loop using an ordinary PI regulator is difficult with appropriate current loop frequency crossover at the crossover frequency $\omega_{co}$ of the current control loop, due to very large resonance peak of the output filter 30. In one possible embodiment, the controller 100 uses PI regulators 106 in combination with one, two or more lag compensator units, either following the PI regulators 106 in a current control or 101, or using an alternate filter position in the current feedback loop 108k as shown in FIG. 4. In the first embodiment, with the lag compensator filter or filters 108 following the PI regulator 106, the PI controller transfer function with one lag or two lag units and can be represented as follows:

$$H_{PI.1lag.unit} = \frac{1+T_{ld}}{T_{int}p} \cdot \frac{1}{1+T_{lag1}p} = [K_{i.norm}p + K_{p.norm}] \cdot \frac{\omega_{lag1}}{\omega_{lag1}+p} \quad (15)$$

$$H_{PI.2lag.units} = \frac{1+T_{ld}}{T_{int}p} \cdot \frac{1}{1+T_{lag1}p} \cdot \frac{1}{1+T_{lag2}p} = [K_{i.norm}p + K_{p.norm}] \cdot \frac{\omega_{lag1}}{\omega_{lag1}+p} \cdot \frac{\omega_{lag2}}{\omega_{lag2}+p} \quad (16)$$

The graph 700 in FIG. 7 shows a Bode magnitude log-log plot of the typical object (plant) for fundamental frequency (e.g., inverter operating frequency) equal to zero. The graph 800 in FIG. 8 shows a Bode magnitude log-log plot of the typical object (plant) for some fundamental frequency not equal to zero. The graph 900 in FIG. 9 shows a Bode magnitude log-log plot of current loop together with ordinary PI controller with some fundamental frequency. Below is an analysis of the system with the PI regulator 106 in combination with one or two first-order lag units to express the relationship between PI controller parameters and system parameters. Example embodiments provide appropriate stability margin with respect to the amplitude margin at or near the control loop resonance frequency $\omega_{d,q.res}$ as well as appropriate phase margin at the current control loop crossover frequency $\omega_{co}$.

In one example, the lag compensator filter 108 includes a first lag compensator filter having a first lag filter corner frequency $\omega_{lag\_1}$ between the current loop crossover frequency $\omega_{co}$ and the current control loop resonance frequency $c_{d,q.res}$. In other examples, as discussed further with reference to FIG. 11 below, the lag compensator filter 108 includes a second lag compensator filter having a second lag filter corner frequency $\omega_{lag\_2}$ between the first lag filter corner frequency $\omega_{lag\_1}$ and the current control loop resonance frequency $\omega_{d,q.res}$. The first and/or second lag compensators are designed to provide a non-zero amplitude margin 1010, 1110 in FIGS. 10 and 11) below unity at the resonance frequency $\omega_{d,q.res}$. In certain embodiments, the lag compensators are designed to provide a non-zero phase margin at the current control loop crossover frequency $\omega_{co}$ of the current control loop.

FIG. 10 illustrates a single lag compensator example to implement the following transfer function:

$$H_{PI.1lag.unit} = R_\Sigma \cdot \frac{1+pT_{ld}}{pT_{int}} \cdot \frac{1}{1+pT_{lag}} = \quad (17)$$

$$R_\Sigma \cdot [K_{i.norm}p + K_{p.norm}] \cdot \frac{\omega_{lag}}{\omega_{lag}+p} = [K_ip + K_p] \cdot \frac{\omega_{lag}}{\omega_{lag}+p}$$

where the integral and proportional constants are given by the following per equations 13 and 14:

$$K_i = R_\Sigma \cdot K_{i.norm} = R_\Sigma \cdot \frac{1}{T_{int}} = R_\Sigma \cdot \omega_{int} \quad (18)$$

$$K_p = R_\Sigma \cdot K_{p.norm} = R_\Sigma \cdot \frac{T_{ld}}{T_{int}} = R_\Sigma \cdot \frac{\omega_{int}}{\omega_{ld}} \quad (19)$$

FIG. 10 represents the Bode magnitude log-log plot for the above current loop with the current controller 101 that includes a first or single lag compensator unit and the fundamental frequency $\omega_{fund}$ is equal to a maximum value. As seen in FIG. 10 it is desired to add an additional parameter that can be called amplitude "margin" 1010. Typically, this margin 1010 should be not less than 1.5 (3.5 db) (arbitrary number) or more due to a filter resistor variation (see equations 6, 7, and 9). In certain examples, the relationship between the filter resonance frequency "$\omega_{pk}$", the current loop frequency crossover "$\omega_{co}$" and the rest of PI controller's parameters are designed according to the condition is shown in FIG. 10 (a single lag compensator unit approach).

For the triangle "FGM" in FIG. 10, the following holds:

$$20\log(MG) = 20\log(FM) = 20\log(\omega_{lag}) - 20\log(\omega_{co.1}) = 20\log\left(\frac{\omega_{lag}}{\omega_{co.1}}\right) \quad (20)$$

Or:

$$MG = \frac{\omega_{lag}}{\omega_{co.1}}. \quad (20a)$$

For the triangle "DGM", the following holds:

$$20\log(MG) = 40\log(DM) = 40\log(\omega_{lag}) - 40\log(\omega_D) = 20\log\left(\frac{\omega_{lag}^2}{\omega_D^2}\right) \quad (21)$$

Or:

$$MG = \frac{\omega_{lag}^2}{\omega_D^2} \quad (22)$$

From equations 20a and 22, the following can be derived:

$$\frac{\omega_{lag}}{\omega_{co.1}} = \frac{\omega_{lag}^2}{\omega_D^2}, \text{ or}: \omega_D = \sqrt{\omega_{co.1} \cdot \omega_{lag}}, \quad (23)$$

where "$\omega_{co.1}$" is a current loop frequency crossover for the single lag unit approach.

For the triangle "DKN", using equation 16, the following holds:

$$20\log(NK) = 40\log(\omega_{pk} - \omega_{fund}) - 40\log(\omega_D) = \qquad (24)$$
$$40\log(\omega_{pk} - \omega_{fund}) - 40\log\left(\sqrt{\omega_{co.1} - \omega_{lag}}\right) =$$
$$20\log\left(\frac{(\omega_{pk} - \omega_{fund})^2}{\omega_{co.1} \cdot \omega_{lag}}\right).$$

where "$\omega_{fund}$" is the fundamental frequency (maximum fundamental frequency determined by a specific application. The lag compensator filter 108 in one example includes a first lag compensator filter having a first lag filter corner frequency ($\omega_{lag.1}$) between the current loop frequency crossover ($\omega_{co}$) and the current control loop resonance frequency ($\omega_{d,q.res}$):

$$\omega_{lag.1} = \alpha \cdot \omega_{co.1} \qquad (25)$$

A minimum value for the coefficient "a" can be selected based on an appropriate additional phase shift that "lag unit" brings into an overall phase shift at the current loop frequency crossover point. In certain examples, the first lag compensator (and any included second lag compensator) is designed to provide a non-zero phase margin (1010, 1110 in FIGS. 10 and 11) at the current control loop crossover frequency ($\omega_{co}$) of the current control loop. For example, this additional phase shift should not be more than 25 degrees (arbitrary number). Therefore "$\alpha_{min}$" can be calculated as follows:

$$25^0 > \operatorname{atan}\left[\frac{\omega_{co.1}}{\omega_{lag.min}}\right] = \operatorname{atan}\left[\frac{1}{a_{min}}\right] \qquad (26)$$

Or, from (26):

$$\alpha_{min} = 2.144 \qquad (26a)$$

In a future calculation we will use round "$\alpha_{min}$" as follows:

$$\alpha_{min} = 2 \qquad (27),$$

Then:

$$\operatorname{atan}\left[\frac{1}{2}\right] = 26.56^0 \qquad (27a)$$

Digital implementation brings a limit for maximum value of this coefficient. Practically, good performance for a first order filter can be achieved if the maximum corner frequency ($\omega_{lag.max}$) is no larger than 10% from firmware scan frequency ($\omega_{scan}$) (where 10% is practical arbitrary number). Usually the firmware scan frequency ($\omega_{scan}$) can be determined as follows:

$$\omega_{scan} = 2 \cdot (2 \cdot \pi \cdot f_{carrier}) \qquad (28)$$

And therefore:

$$\omega_{lag.max} = \frac{4 \cdot \pi \cdot f_{carrier}}{10} = \frac{\pi \cdot f_{carrier}}{2.5} \qquad (28a)$$

Therefore for "$\alpha_{max}$" the following can be written:

$$a_{max} = \frac{\omega_{lag.max}}{\omega_{co.1.real}} = \frac{\pi \cdot f_{carrier}}{2.5 \cdot \omega_{co.1.real}} \qquad (29)$$

Finally:

$$\alpha_{min} < \alpha < \alpha_{max} \qquad (30)$$

Or:

$$2 < a < \frac{\pi \cdot f_{carrier}}{2.5 \cdot \omega_{co.1}} \qquad (31)$$

From (24) and (25) we can derive:

$$NK = \frac{(\omega_{pk} - \omega_{fund})^2}{\omega_{co.1} \cdot \omega_{lag}} = \frac{(\omega_{pk} - \omega_{fund})^2}{a \cdot \omega_{co.1}^2} \qquad (32)$$

In addition, (see FIG. 10):

$$20\log(NK) = \qquad (33)$$
$$20\log\left(\frac{1}{2 \cdot \xi}\right) + 20\log(\text{margin}) = 20\log\left(\frac{\text{margin}}{2 \cdot \xi}\right) \text{ and } NK = \frac{\text{margin}}{2 \cdot \xi}$$

where the stability margin limit can be determine as follows (3.5 db is a practical arbitrary number):

$$3.5 \leq db \leq 20 \log(\text{margin}). \text{ Or: } 1.5 \leq \text{margin and margin}_{min} = 1.5 \qquad (34)$$

Appropriate values can be calculated for current loop frequency crossover using equations 32 and 33:

$$\omega_{co} = (\omega_{pk} - \omega_{fund}) \cdot \sqrt{\frac{2 \cdot \xi}{a \cdot \text{margin}}} \qquad (35)$$

Or, with the help of equations 27 and 34:

$$\omega_{co.max} = (\omega_{pk} - \omega_{fund.max}) \cdot \sqrt{\frac{2 \cdot \xi}{a_{min} \cdot \text{margin}_{min}}} = \qquad (36)$$
$$(\omega_{pk} - \omega_{fund.max}) \cdot \sqrt{\frac{\xi}{1.5}} = \frac{(\omega_{pk} - \omega_{fund.max})}{1.2247} \cdot \sqrt{\xi}$$

According to equation 36, a current loop frequency crossover can be selected as follows:

$$\omega_\Sigma \leq \omega_{co.1.real} \leq \frac{(\omega_{pk} - \omega_{fund.max})}{1.2247} \cdot \sqrt{\xi}, \qquad (37)$$

Where "$\omega_\Sigma$" is the plant corner frequency (see equation 2).

According to (27, and 29) the following can be written:

$$2 \cdot \omega_{co.1.real} \leq \omega_{lag.real} \leq \frac{\pi \cdot f_{carrier}}{2.5 \cdot \omega_{co.1}} \quad (38)$$

And real margin can be calculated from (25, 32 and 33) as follows:

$$\text{margin}_{real} = \frac{2 \cdot \xi \cdot (\omega_{pk} - \omega_{fund.real})^2}{a_{real} \cdot \omega_{co.1.real}^2} = \frac{2 \cdot \xi \cdot (\omega_{pk} - \omega_{fund.real})^2}{\omega_{co.1.real} \cdot \omega_{lag.real}} \quad (39)$$

Now we need to determine appropriate "$K_i$, $K_p$" values. From triangle "ZYF" the following can be written:

$$20\log(ZY) = 20\log(ZF) = 20\log(\omega_{co.1}) - 20\log(\omega_{ld}) = 20\log\left(\frac{\omega_{co.1}}{\omega_{ld}}\right) \quad (40)$$

Or:

$$ZY = \frac{\omega_{co.1}}{\omega_{ld}} \quad (41)$$

From triangle "ZYE" the following can be written:

$$20\log(ZY) = \quad (42)$$

$$40\log(ZE) = 40\log(\omega_E) - 40\log(\omega_{ld}) = 40\log\left(\frac{\omega_E}{\omega_{ld}}\right) = 20\log\left(\frac{\omega_E^2}{\omega_{ld}^2}\right)$$

Or:

$$ZY = \frac{\omega_E^2}{\omega_{ld}^2} \quad (43)$$

From (41) and (43):

$$\omega_E^2 = \omega_{co.1} \cdot \omega_{ld} \quad (44)$$

From triangle "XPE" the following can be written:

$$20\log(PX) = 40\log(XE) = 40\log(\omega_E) - 40\log(\omega_\Sigma) = 20\log\left(\frac{\omega_E^2}{\omega_\Sigma^2}\right) \quad (45)$$

Or with the help of (44):

$$PX = \frac{\omega_E^2}{\omega_\Sigma^2} = \frac{\omega_{co.1} \cdot \omega_{ld}}{\omega_\Sigma^2} \quad (46)$$

Now, from triangle "XPB" the following can be written:

$$20\log(PX) = 20\log(BX) = 20\log(\omega_{int}) - 20\log(\omega_\Sigma) = 20\log\left(\frac{\omega_{int}}{\omega_\Sigma}\right) \quad (47)$$

Or:

$$(PX) = \frac{\omega_{int}}{\omega_\Sigma} \quad (48)$$

From (46) and (48):

$$\omega_{int} = \frac{\omega_{co.1} \cdot \omega_{ld}}{\omega_\Sigma} \quad (49)$$

Let's take into account equation (2), then:

$$\omega_{int} = \frac{L_{sys} \cdot \omega_{co.1} \cdot \omega_{ld}}{R_\Sigma} \quad (50)$$

Let's determine the limitation for "$\omega_{ld}$" as follows:

$$\omega_\Sigma \leq \omega_{ld.real} \leq \omega_{co.1.real} \quad (51)$$

Let's represent "$\omega_{ld}$" using the following equality:

$$\omega_{ld} = b \cdot \omega_\Sigma \quad (52)$$

Or $$b = \frac{\omega_{ld}}{\omega_\Sigma} \quad (52a)$$

According to (51) limitation for "b" can be written as follows:

$$1 \leq b_{real} \leq \frac{\omega_{co.1.real}}{\omega_\Sigma} \quad (53)$$

Finally "$K_i$" and "$K_p$" can be determined according to equations (18, 50) and (19, 50) as follows:

$$K_i = R_\Sigma \cdot \omega_{int} = L_{sys} \cdot \omega_{co.1.real} \cdot \omega_{ld} = L_{sys} \cdot \omega_{co.1.real} \cdot b_{real} \cdot \omega_\Sigma \quad (54)$$

$$K_p = R_\Sigma \cdot \frac{\omega_{int}}{\omega_{ld}} = L_{sys} \cdot \omega_{co.1.real} \quad (55)$$

Or:

$$K_i = K_p \cdot \omega_{ld} = K_p \cdot b_{real} \cdot \omega_\Sigma \quad (56)$$

Equations (39, 51-56) determines all PI controller parameters.

To determine PI controller's parameters more precisely let's analyze phase margin at the current loop frequency crossover point.

According to FIG. 6 the open current loop transfer function can be written as follows:

$$H_{i.open-loop}(p) = H_{PI}(p) \cdot H_{inv}(p) \cdot H_{object}(p) = \left[R_\Sigma \cdot \frac{(1 + pT_{ld})}{pT_{int}} \cdot \right. \quad (57)$$

$$\left. \frac{1}{1 + pT_{lag}}\right] \cdot [e^{\omega\tau}] \cdot \left[\frac{1}{R_\Sigma} \cdot \frac{1}{1 + pT_\Sigma} \cdot \frac{1}{1 + 2\xi T_{pkP} + T_{pk}^2 p^2}\right]$$

Finally $$H_{i.open-loop}(p) = H_{PI}(p) \cdot H_{inv}(p) \cdot H_{object}(p) = \quad (58)$$

$$\frac{1}{pT_{int}} \cdot e^{\omega \cdot \tau} \cdot (1 + pT_{ld}) \cdot \frac{1}{1 + pT_{lag}} \cdot \frac{1}{1 + pT_\Sigma} \cdot \frac{1}{1 + 2\xi T_{pk} p + T_{pk}^2 p^2}$$

Where "τ" is inverter time delay and can be represented as follows:

$$\tau = \frac{1}{f_{carrier.inverter}} \quad (59)$$

Appropriate phase margin at the point of current loop frequency crossover can be determine based on the follows equation:

$$\Delta\varphi^0(\omega_{co.1.real}) = 180^0 - \varphi_{total\text{-}phase\text{-}shift\text{-}open\text{-}current\text{-}loop}^0 \geq 30^0 \quad (60)$$

Where "$30^0$" is a practical arbitrary phase margin.
According to (58, 60) the following can be written:

$$\Delta\varphi^0(\omega_{co.1.real}) = 180^0 - 90^0 - \quad (61)$$

$$\frac{180^0}{\pi} \cdot \left[ \tau \cdot \omega_{co.1.real} + \text{atan}\left(\frac{\omega_{co.1.real}}{\omega_{lag}}\right) + \text{atan}\left(\frac{\omega_{co.1.real}}{\omega_\Sigma}\right) - \right.$$

$$\left. \text{atan}\left(\frac{\omega_{co.1.real}}{\omega_{ld}}\right) + \text{atan}\left(\frac{2 \cdot \xi \cdot \omega_{co.1.real}}{\omega_{pk} - \frac{\omega_{co.1.real}^2}{\omega_{pk}}}\right) \right] \geq 30^0$$

Practically, term $$\text{"}\frac{180^0}{\pi} \cdot \left[ \text{atan}\left(\frac{2 \cdot \xi \cdot \omega_{co.1.real}}{\omega_{pk} - \frac{\omega_{co.1.real}^2}{\omega_{pk}}}\right) \right]\text{"}$$

is very small (less than 1 degree) and can be omitted.
Finally, phase margin can be rewritten as follows:

$$\Delta\varphi^0(\omega_{co.1.real}) = \quad (62)$$

$$90^0 - \frac{180^0}{\pi} \cdot \left\{ \tau \cdot \omega_{co.1.real} + \text{atan}\left(\frac{\omega_{co.1.real}}{\omega_{lag.real}}\right) + \left[\text{atan}\left(\frac{\omega_{co.1.real}}{\omega_\Sigma}\right) - \right. \right.$$

$$\left. \left. \text{atan}\left(\frac{\omega_{co.1.real}}{\omega_{ld.real}}\right)\right] \right\} \geq 30^0$$

Or, after some manipulation:

$$\Delta\varphi^0(\omega_{co.1.real}) = 90^0 - \frac{180^0}{\pi} \cdot \left\{ \tau \cdot \omega_{co.1.real} + \text{atan}\left(\frac{\omega_{co.1.real}}{\omega_{lag.real}}\right) + \quad (62a) \right.$$

$$\left. \text{atan}\left(\frac{\omega_{co.1.real} \cdot (\omega_{ld.real} - \omega_\Sigma)}{\omega_{ld.real} \cdot \omega_\Sigma + \omega_{co.1.real}^2}\right) \right\} \geq 30^0$$

Or:

$$\Delta\varphi^0(\omega_{co.1.real}) = \quad (63)$$

$$90^0 - \left(\frac{180^0}{\pi}\right) \cdot \left\{ (\omega_{co.1.real} \cdot \tau) + \left[\text{atan}\left(\frac{x+y}{1-x \cdot y}\right)\right] \right\} > 30^0$$

Where:

$$y = \frac{\omega_{co.1.real} \cdot (\omega_{ld.real} - \omega_\Sigma)}{\omega_{ld.real} \cdot \omega_\Sigma + \omega_{co.1.real}^2} = \frac{\omega_{co.1.real} \cdot \omega_\Sigma \cdot (b_{real} - 1)}{b_{real} \cdot \omega_\Sigma^2 + \omega_{co.1.real}^2} \quad (65)$$

Manipulate with "$\omega_{ld}$", "$\omega_{lag}$", sometimes "$\omega_{co.1.real}$" and take into account (37, 38, and 51) finally we can establish all necessary PI controller's parameters with appropriate phase margin.

FIG. 11 shows another example using first and second lag units, where the transfer function can be represented as follows:

$$H_{PI-2lag} = R_\Sigma \cdot \frac{1 + pT_{ld}}{pT_{int}} \cdot \frac{1}{1 + pT_{lag1}} \cdot \quad (66)$$

$$\frac{1}{1 + pT_{lag2}} = [K_i p + K_p] \cdot \frac{\omega_{lag1}}{\omega_{lag1} + p} \cdot \frac{\omega_{lag2}}{\omega_{lag2} + p}$$

Where "$K_i$" and "$K_p$" can be determined by according to equations (18-19).

FIG. 11 represents general Bode log-log plot for the above current loop with a controller that includes two lag units. As you can see with two lag units approach current loop frequency crossover can be reached well larger value with the same stability margin. The following demonstrates a relationship between the filter resonance frequency "$\omega_{pk}$", the current loop frequency crossover "$\omega_{co}$" and the rest of controller's parameters according to the condition is shown on FIG. 11.

For triangle "SRT" the following can be written:

$$20\log(TR) = 60\log(TS) = 60\log(\omega_{lag\cdot 2}) - 60\log(\omega_S) = 60\log\left(\frac{\omega_{lag\cdot 2}^3}{\omega_S^3}\right) \quad (67)$$

Or:

$$TR = \frac{\omega_{lag\cdot 2}^3}{\omega_S^3}. \quad (68)$$

For triangle "DTR" the following can be written:

$$20\log(TR) = 40\log(TD) = 40\log(\omega_{lag\cdot 2}) - 40\log(\omega_D) = 40\log\left(\frac{\omega_{lag\cdot 2}^2}{\omega_D^2}\right) \quad (69)$$

Or:

$$TR = \frac{\omega_{lag\cdot 2}^2}{\omega_D^2}. \quad (70)$$

From (68) and (70) we can derive:

$$\frac{\omega_{lag \cdot 2}^3}{\omega_S^3} = \frac{\omega_{lag \cdot 2}^2}{\omega_D^2} \qquad (71)$$

Or:

$$\omega_S^3 = \frac{\omega_{lag \cdot 2}^3 \cdot \omega_D^2}{\omega_{lag \cdot 2}^2} = \omega_{lag \cdot 2} \cdot \omega_D^2 \qquad (72)$$

For triangle "FGM" the following can be written:

$$20\log(MG) = \qquad (73)$$
$$20\log(FM) = 20\log(\omega_{lag \cdot 1}) - 20\log(\omega_{co \cdot 2}) = 20\log\left(\frac{\omega_{lag \cdot 1}}{\omega_{co \cdot 2}}\right),$$

Or:

$$MG = \frac{\omega_{lag \cdot 1}}{\omega_{co \cdot 2}}. \qquad (74)$$

For triangle "DGM" the following can be written:

$$20\log(MG) = 40\log(\omega_{lag \cdot 1}) - 40\log(\omega_D) = 20\log\left(\frac{\omega_{lag \cdot 1}^2}{\omega_D^2}\right) \qquad (75)$$

Or:

$$MG = \frac{\omega_{lag \cdot 1}^2}{\omega_D^2} \qquad (76)$$

From (74) and (76) we can derive:

$$\frac{\omega_{lag \cdot 1}}{\omega_{co \cdot 2}} = \frac{\omega_{lag \cdot 1}^2}{\omega_D^2} \qquad (77)$$

Or:

$$\omega_D = \sqrt{\omega_{co \cdot 2} \cdot \omega_{lag \cdot 1}} \qquad (78)$$

From (72) and (78) we can derive:

$$\omega_S^3 = \omega_{lag \cdot 2} \cdot \omega_D^2 = \omega_{co \cdot 2} \cdot \omega_{lag \cdot 1} \cdot \omega_{lag \cdot 2} \qquad (79)$$

For triangle "SNK" the following can be written:

$$20\log(NK) = 60\log(NS) = \qquad (80)$$
$$60\log(\omega_{pk} - \omega_{fund}) - 60\log(\omega_s) = 20\log\left(\frac{(\omega_{pk} - \omega_{fund})^3}{\omega_S^3}\right)$$

Or:

$$NK = \frac{(\omega_{pk} - \omega_{fund})^3}{\omega_S^3} \qquad (81)$$

From (79) and (81) we can derive:

$$NK = \frac{(\omega_{pk} - \omega_{fund})^3}{\omega_{co \cdot 2} \cdot \omega_{lag \cdot 1} \cdot \omega_{lag \cdot 2}} \qquad (82)$$

$$20\log(NK) = 20\log(KW) + 20\log(NW) = \qquad (83)$$
$$20\log\left(\frac{1}{2 \cdot \xi}\right) + 20\log(\text{margin}) = 20\log\left(\frac{\text{margin}}{2 \cdot \xi}\right)$$

A stability margin limit can be determine as follows (3.5 db is a practical arbitrary number):

$$3.5 \text{ db} \leq 20 \log(\text{margin}) \qquad (84)$$

Or:

$$1.5 \leq \text{margin} \qquad (85)$$

From (85):

$$\text{margin}_{min} = 1.5 \qquad (86)$$

Therefore from equation (83):

$$NK = \frac{\text{margin}}{2 \cdot \xi} \qquad (87)$$

Finally, we can calculate a limit value for current loop frequency crossover using equations (82, 86, and 87):

$$\omega_{co \cdot 2 \cdot max} = \frac{2 \cdot \xi \cdot (\omega_{pk} - \omega_{fund \cdot max})^3}{\text{margin}_{min} \cdot \omega_{lag \cdot 1 \cdot real} \omega_{lag \cdot 2 \cdot real}} \qquad (88)$$

According to equations (25, 27)

$$\omega_{lag \cdot 1 \cdot min} = 2 \cdot \omega_{co2} \qquad (89)$$

According to equation (27a) maximum phase shift at a current loop frequency crossover for "$\omega_{lag \cdot 1 \cdot min}$" equals:

$$\Delta\varphi^0(\omega_{lag \cdot 1 \cdot min(@\omega_{co \cdot 2})}) = 26.56^0 \qquad (89a)$$

"$\omega_{lag \cdot 2}$" can be represented as follows:

$$\omega_{lag \cdot 2} = d \cdot \omega_{co \cdot 2} \qquad (90)$$

Practically (just for example) this additional phase shift should not be more than 15 degrees (arbitrary number). Therefore "$d_{min}$" can be calculated as follows:

$$15^0 > \text{atan}\left[\frac{\omega_{co \cdot 2}}{\omega_{lag \cdot 2 \cdot min}}\right] = \text{atan}\left[\frac{1}{d_{min}}\right] \qquad (90a)$$

Or, from (26):

$$d_{min} = 3.73 \qquad (90b)$$

In a future calculation we will use round "$d_{min}$" as follows:

$$d_{min}=3.5 \quad (90c),$$

Then:

$$\text{atan}\left[\frac{1}{3.5}\right]=15.94^0 \quad (90d)$$

Therefore combined additional phase shift from 2 lag units equals (see equations 89a and 90d):

$$\Delta\varphi^0_{2.lag.units}=\Delta\varphi^0(\omega_{lag.1.min(@\omega_{co.2})})+\Delta\varphi^0(\omega_{lag.2.min(@co.2)})=26.56^0+15.94^0=42.5^0 \quad (90e).$$

$$\omega_{lag.2.min}=3.5\cdot\omega_{co.2} \quad (91)$$

Now we can recalculate current loop frequency crossover limit (88) with the help of equations (86, 89, and 91) as follows:

$$\omega_{co.2.max}=(\omega_{pk}-\omega_{fund.max})\cdot\sqrt[3]{\frac{2\cdot\xi}{a_{min}\cdot d_{min}\cdot\text{margin}_{min}}}= \quad (92)$$

$$(\omega_{pk}-\omega_{fund.max})\cdot\sqrt[3]{\frac{\xi}{5.25}}=\frac{(\omega_{pk}-\omega_{fund.max})}{1.738}\cdot\sqrt[3]{\xi}$$

According to (92) with some additional margin we can choose any current loop frequency crossover as follows:

$$\omega_\Sigma\leq\omega_{co.2.real}\leq\frac{(\omega_{pk}-\omega_{fund.max})}{1.738}\cdot\sqrt[3]{\xi} \quad (93)$$

Minimum corner frequency of a lag1 unit can be calculated as follows:

$$\omega_{lag.1.min}=2\cdot\omega_{co.2.real} \quad (94)$$

Minimum corner frequency of a lag2 unit can be calculated as follows:

$$\omega_{lag.2.min}=3.5\cdot\omega_{co.2.real} \quad (95)$$

According to (94, 95) and practical digital implementation (29) of lag units the following can be written:

$$2\cdot\omega_{co.2.real}\leq\omega_{la.1.real}\leq\frac{\pi\cdot f_{carrier}}{2.5\cdot\omega_{co.2.real}} \quad (96)$$

$$3.5\cdot\omega_{co.2.real}\leq\omega_{lag.2.real}\leq\frac{\pi\cdot f_{carrier}}{2.5\cdot w_{co.2.real}} \quad (97)$$

And real margin can be calculated as follows:

$$\text{margin}_{real}=\frac{2\cdot\xi\cdot(\omega_{pk}-\omega_{fund.max})^3}{\omega_{co.2.real}\cdot\omega_{lag.1.real}\cdot\omega_{lag.2.real}} \quad (98)$$

Now we need to determine appropriate "$K_i, K_p$" values. From triangle "ZYF" the following can be written:

$$20\log(ZY)=20\log(ZF)=20\log(\omega_{co.2})-20\log(\omega_{ld})=20\log\left(\frac{\omega_{co.2}}{\omega_{ld}}\right) \quad (99)$$

Or:

$$ZY=\frac{\omega_{co.2}}{\omega_{ld}} \quad (100)$$

From triangle "ZYE" the following can be written:

$$20\log(ZY)= \quad (101)$$

$$40\log(ZE)=40\log(\omega_E)-40\log(\omega_{ld})=40\log\left(\frac{\omega_E}{\omega_{ld}}\right)=20\log\left(\frac{\omega_E^2}{\omega_{ld}^2}\right)$$

Or:

$$ZY=\frac{\omega_E^2}{\omega_{ld}^2} \quad (102)$$

From (100) and (102):

$$\omega_E^2=\omega_{co.2}\cdot\omega_{ld} \quad (103)$$

From triangle "XPE" the following can be written:

$$20\log(PX)=40\log(XE)=40\log(\omega_E)-40\log(\omega_\Sigma)=20\log\left(\frac{\omega_E^2}{\omega_\Sigma^2}\right) \quad (104)$$

Or with the help of (103):

$$PX=\frac{\omega_E^2}{\omega_\Sigma^2}=\frac{\omega_{co.2}\omega_{ld}}{\omega_\Sigma^2} \quad (105)$$

Now, from triangle "XPB" the following can be written:

$$20\log(PX)=20\log(BX)=20\log(\omega_{int})-20\log(\omega_\Sigma)=20\log\left(\frac{\omega_{int}}{\omega_\Sigma}\right) \quad (106)$$

Or:

$$(PX)=\frac{\omega_{int}}{\omega_\Sigma} \quad (107)$$

From (105) and (107):

$$\omega_{int}=\frac{\omega_{co.2}\cdot\omega_{ld}}{\omega_\Sigma} \quad (108)$$

Let's take into account equation (2), then:

$$\omega_{int}=\frac{L_{sys}\cdot\omega_{co.2}\cdot\omega_{ld}}{R_\Sigma} \quad (109)$$

Let's determine the limitation for "$\omega_{ld}$" as follows:

$$\omega_\Sigma\leq\omega_{kd}\leq\omega_{co.2.real} \quad (110)$$

Finally "$K_i$" and "$K_p$" can be determined according to equations (18, 109) and (19, 110) as follows:

$$K_p = R_\Sigma \cdot \frac{\omega_{int}}{\omega_{ld}} = L_{sys} \cdot \omega_{co\cdot 2\cdot real} \quad (111)$$

$$K_i = R_\Sigma \cdot \omega_{int} = L_{sys} \cdot \omega_{co\cdot 2\cdot real} \cdot w_{ld} = K_p \cdot \omega_{ld} \quad (112)$$

Equations (96-97, 111-112) determines all controller's parameters.

It is possible to determine controller's parameters more precisely if we will analyze phase margin at the current loop frequency crossover point. According to FIG. 6, the following can be written the open current loop transfer function as follows:

$$H_{i\text{-}open-loop\cdot 2lag}(p) = \quad (113)$$

$$H_{PI\cdot 2lag}(p) \cdot H_{inv}(p) \cdot H_{object}(p) = \left[R_\Sigma \cdot \frac{(1+pT_{ld})}{pT_{int}} \cdot \frac{1}{1+pT_{lag1}} \cdot \right.$$

$$\left. \frac{1}{1+pT_{lag2}}\right] \cdot [e^{\omega\cdot\tau}] \cdot \left[\frac{1}{R_\Sigma} \cdot \frac{1}{1+pT_\Sigma} \cdot \frac{1}{1+2\xi T_{pk}p+T_{pk}^2 p^2}\right]$$

Finally:

$$H_{i\text{-}open-loop\cdot 2lag}(p) = \quad (114)$$

$$H_{PI\cdot 2lag}(p) \cdot H_{inv}(p) \cdot H_{object}(p) = \frac{1}{pT_{int}} \cdot e^{\omega\cdot\tau} \cdot (1-pT_{ld}) \cdot$$

$$\frac{1}{1+pT_{lag1}} \cdot \frac{1}{1+pT_{lag2}} \cdot \frac{1}{1+pT_\Sigma} \cdot \frac{1}{1+2\xi T_{pk}p+T_{pk}^2 p^2}$$

Where "$\tau$" is inverter time delay and can be represent as follows:

$$\tau = \frac{1}{f_{carrier\text{-}inverter}} \quad (115)$$

Appropriate phase margin at the point of current loop frequency crossover can be determine based on follows equation:

$$\Delta\varphi^0(\omega_{co\cdot 2\cdot real}) = 180^0 - \varphi_{total\text{-}phase\text{-}shift\text{-}open\text{-}current\text{-}loop\cdot 2lag}^0 \geq 30^0 \quad (116)$$

According to (105, 107) the following can be written:

$$\Delta\varphi^0(\omega_{co\cdot 2}) =$$

$$180^0 - 90^0 - \frac{180^0}{\pi} \cdot \left\{\tau \cdot \omega_{co\cdot 2} - \text{atan}\left(\frac{\omega_{co\cdot 2}}{\omega_{ld\cdot real}}\right) + \text{atan}\left(\frac{\omega_{co\cdot 2}}{\omega_{lag1\cdot real}}\right) + \right.$$

$$\left. \text{atan}\left(\frac{\omega_{co\cdot 2}}{\omega_{lag2\cdot real}}\right) + \text{atan}\left(\frac{\omega_{co\cdot 2}}{\omega_\Sigma}\right) + \text{atan}\left(\frac{2\cdot\xi\cdot\omega_{co\cdot 2}}{\omega_{pk} - \frac{\omega_{co\cdot 2}^2}{\omega_{pk}}}\right)\right\} \geq 30^0$$

Practically, term

"$\text{atan}\left(\frac{2\cdot\xi\cdot\omega_{co\cdot 2\cdot real}}{\omega_{pk} - \frac{\omega_{co\cdot 2\cdot real}^2}{\omega_{pk}}}\right)$"

is very small (less than 1 degree) and can be omitted.
Finally, phase margin can be write as follows:

$$\Delta\varphi^0(\omega_{co\cdot 2\cdot real}) = 90^0 - \frac{180^0}{\pi} \cdot \left\{\tau \cdot \omega_{co\cdot 2\cdot real} + \left[\text{atan}\left(\frac{\omega_{co\cdot 2\cdot real}}{\omega_{ld}}\right) - \right.\right. \quad (117)$$

$$\left.\left. \text{atan}\left(\frac{\omega_{co\cdot 2\cdot real}}{\omega_\Sigma}\right)\right] + \left[\text{atan}\left(\frac{\omega_{co\cdot 2\cdot real}}{\omega_{lag1}}\right) + \text{atan}\left(\frac{\omega_{co\cdot 2\cdot real}}{\omega_{lag2}}\right)\right]\right\} \geq 30^0$$

After some manipulation we can derive:

$$\Delta\varphi^0(\omega_{co\cdot 2\cdot real}) = \quad (118)$$

$$90^0 - \left(\frac{180^0}{\pi}\right) \cdot \left\{(\tau \cdot \omega_{co\cdot 2\cdot real}) + \left[\text{atan}\left(\frac{x+y}{1-x\cdot y}\right)\right]\right\} > 30^0$$

Where:

$$x = \frac{\omega_{co\cdot 2\cdot real} \cdot (\omega_{ld\cdot real} - \omega_\Sigma)}{\omega_{ld\cdot real} \cdot \omega_\Sigma + \omega_{co\cdot 2\cdot real}^2} \quad (119)$$

$$y = \frac{\omega_{co\cdot 2\cdot real} \cdot (\omega_{lag\cdot 1\cdot real} + \omega_{lag\cdot 2\cdot real})}{\omega_{lag\cdot 1\cdot real} \cdot \omega_{lag\cdot 2\cdot real} - \omega_{co\cdot 2\cdot real}^2} \quad (120)$$

Manipulate with "$\omega_{ld}$", "$\omega_{lag1}$", "$\omega_{lag2}$", sometimes "$\omega_{co\cdot 2\cdot real}$" and take into account (93, 96, 97, and 110) finally we can establish all necessary PI controller's parameters. Disclosed examples include power conversion systems 40, methods 300 and computer readable mediums 104 to operate an inverter 46 to drive a motor load 20 through an output filter 30, in which a control output value $CO_{d,q}$ is computed according to a current reference value $I_{d,q,ref}$ and a current feedback value $I_{d,q,fbk}$ using a proportional-integral PI current regulator 106, the control output value $CO_{d,q}$ is filtered using a lag compensator filter 108 to compute an inverter output command value $V_{d,q.com}$, and the inverter 46 is controlled according to the inverter output command value $V_{d,q.com}$. The examples of FIGS. 10 and 11 use a single lag compensator 108 with a corner frequency profile 1006, 1106 to provide a −20 db/dc slope in combination with the leading characteristic of the PI regulator to shift the profile of the closed current loop curve 1004, 1104 to ensure a desired amplitude margin 1010, 1110 below unity (below the X axis in FIGS. 10 and 11), in consideration of the peak amplitude amount 1012, 1112 associated with the weakly damped output filter 30. In addition, disclosed examples of the lag compensator filter (108) are designed to provide a non-zero phase margin (1010, 1110) at the current control loop crossover frequency ($\omega_{co}$) of the closed current control loop.

In the preceding specification, various embodiments have been described with reference to the accompanying drawings. It will be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The following is claimed:

1. A power conversion system, comprising:
an inverter comprising a DC input, an AC output, and a plurality of switching devices coupled between the DC input and the AC output and operative according to inverter switching control signals to convert DC electrical power received at the DC input to provide AC electrical output power at the AC output to drive a motor load through an intervening output filter; and
a controller configured to:
compute a control output value according to a current reference value and a current feedback value using a proportional-integral (PI) current regulator implemented by the controller,
filter the control output value to compute an inverter output command value using a lag compensator filter implemented by the controller, wherein the lag compensator filter is designed to provide a non-zero amplitude margin below unity at a resonance frequency of a current control loop, and
provide the inverter switching control signals to control the inverter according to the inverter output command value.

2. The power conversion system of claim 1, wherein the lag compensator filter includes one or more lag compensators designed according to a current control loop resonance frequency of a current control loop, an inverter operating fundamental frequency, a peak resonance frequency of the output filter, a desired lead corner frequency of the current control loop, a desired amplitude margin below unity at the resonance frequency of the current control loop, a desired current control loop crossover frequency of the current control loop, and a plant corner frequency, wherein the current control loop resonance frequency is equal to a difference between the peak resonance frequency of the output filter and the inverter operating fundamental frequency.

3. The power conversion system of claim 2, wherein the lag compensator filter includes a first lag compensator filter having a first lag filter corner frequency between the current control loop crossover frequency and the current control loop resonance frequency.

4. The power conversion system of claim 3, wherein the lag compensator filter includes a second lag compensator filter having a second lag filter corner frequency between the first lag filter corner frequency and the current control loop resonance frequency.

5. The power conversion system of claim 4, wherein the first and second lag compensators are designed to provide a non-zero phase margin at the current control loop crossover frequency.

6. The power conversion system of claim 4, wherein the controller is further configured to:
compute a speed error value according to a speed reference value and a speed feedback value;
compute a torque reference value according to the speed error value; and
compute the current reference value according to the torque reference value.

7. The power conversion system of claim 3, wherein the first lag compensator is designed to provide a non-zero phase margin at the current control loop crossover frequency.

8. The power conversion system of claim 3, wherein the controller is further configured to:
compute a speed error value according to a speed reference value and a speed feedback value;
compute a torque reference value according to the speed error value; and
compute the current reference value according to the torque reference value.

9. The power conversion system of claim 2, wherein the lag compensator filter is designed to provide a non-zero phase margin at the current control loop crossover frequency.

10. The power conversion system of claim 2, wherein the controller is further configured to:
compute a speed error value according to a speed reference value and a speed feedback value;
compute a torque reference value according to the speed error value; and
compute the current reference value according to the torque reference value.

11. The power conversion system of claim 1, wherein the lag compensator filter is designed to provide a non-zero phase margin at a current control loop crossover frequency.

12. The power conversion system of claim 1, wherein the controller is further configured to:
compute a speed error value according to a speed reference value and a speed feedback value;
compute a torque reference value according to the speed error value; and
compute the current reference value according to the torque reference value.

13. A method of operating an inverter to drive a motor load through an output filter, the method comprising:
using a proportional-integral (PI) current regulator implemented by a processor, computing a control output value according to a current reference value and a current feedback value;
using the processor, filtering the control output value to compute an inverter output command value using a lag compensator filter implemented by the controller, wherein the lag compensator filter is designed to provide a non-zero amplitude margin below unity at a resonance frequency of a current control loop; and
controlling the inverter according to the inverter output command value.

14. The method of claim 13, comprising:
using the processor, computing a speed error value according to a speed reference value and a speed feedback value;
using the processor, computing a torque reference value according to the speed error value; and
using the processor, computing the current reference value according to the torque reference value.

15. A power conversion system, comprising:
an inverter comprising a DC input, an AC output, and a plurality of switching devices coupled between the DC input and the AC output and operative according to inverter switching control signals to convert DC electrical power received at the DC input to provide AC electrical output power at the AC output to drive a motor load through an intervening output filter; and
a controller configured to:
filter a current feedback value to compute a filtered current feedback value using a lag compensator filter implemented by the controller, wherein the lag compensator filter is designed to provide a non-zero amplitude margin below unity at a resonance frequency of a current control loop,
compute an inverter output command value according to a current reference value and the filtered current feedback value using a proportional-integral (PI) current regulator implemented by the controller, and
provide the inverter switching control signals to control the inverter according to the inverter output command value.

\* \* \* \* \*